United States Patent
Wilner et al.

[11] Patent Number: 5,872,909
[45] Date of Patent: Feb. 16, 1999

[54] LOGIC ANALYZER FOR SOFTWARE

[75] Inventors: David N. Wilner, Oakland; Colin Smith, Alameda; Robert D. Cohen; Dana Burd, both of Oakland; John C. Fogelin, Berkeley; Mark A. Fox, San Francisco; Kent D. Long, Richmond; Stella M. Burns, San Francisco, all of Calif.

[73] Assignee: Wind River Systems, Inc., Alameda, Calif.

[21] Appl. No.: 474,298

[22] Filed: Jun. 7, 1995

Related U.S. Application Data

[63] Continuation-in-part of Ser. No. 378,858, Jan. 24, 1995, abandoned.

[51] Int. Cl.[6] .................... G06F 7/00; G06F 11/32
[52] U.S. Cl. .................. 395/183.14; 395/184.01
[58] Field of Search ................ 395/183.14, 183.22, 395/184.01, 704; 364/550

[56] References Cited

U.S. PATENT DOCUMENTS

| | | | |
|---|---|---|---|
| 3,702,005 | 10/1972 | Ingalls, Jr. .................... | 444/1 |
| 4,166,290 | 8/1979 | Furtman et al. ................ | 364/200 |
| 4,595,981 | 6/1986 | Leung ........................ | 364/300 |
| 4,696,003 | 9/1987 | Kerr et al. .................. | 371/19 |
| 4,755,808 | 7/1988 | Bullock et al. ............... | 340/709 |
| 4,797,885 | 1/1989 | Orimo et al. ................. | 371/19 |
| 4,841,441 | 6/1989 | Nixon et al. ................. | 364/401 |
| 4,872,167 | 10/1989 | Maezawa et al. .............. | 371/19 |
| 4,937,740 | 6/1990 | Agarwal et al. .............. | 395/183.14 |
| 4,943,968 | 7/1990 | Hirose et al. ............... | 371/19 |
| 5,021,997 | 6/1991 | Archie et al. ............... | 364/900 |
| 5,022,028 | 6/1991 | Edmonds et al. .............. | 371/25.1 |
| 5,038,348 | 8/1991 | Yoda et al. .................. | 371/19 |
| 5,048,018 | 9/1991 | Bernstein et al. ............ | 371/19 |
| 5,062,045 | 10/1991 | Janis et al. ................ | 364/200 |
| 5,084,813 | 1/1992 | Ono .......................... | 395/1 |
| 5,086,393 | 2/1992 | Kerr et al. .................. | 364/419 |
| 5,119,377 | 6/1992 | Cobb et al. .................. | 371/19 |
| 5,121,501 | 6/1992 | Baumgartner et al. .......... | 395/800 |

(List continued on next page.)

OTHER PUBLICATIONS

Hideyuki Tokuda, "Arts real–time scheduler analyzer/debugger," Readers' Service 129, May 1990, p. 29 (publication unkown).

*Primary Examiner*—Ly Hua
*Attorney, Agent, or Firm*—Townsend and Townsend and Crew LLP

[57] ABSTRACT

The present invention logs events which occur in the target software, and stores these in a buffer for periodic uploading to a host computer. Such events include the context switching of particular software tasks, and task status at such context switch times, along with events triggering such a context switch, or other events. The host computer reconstructs the real-time status of the target software from the limited event data uploaded to it. The status information is then displayed in a user-friendly manner. This provides the ability to perform a logic analyzer function on real-time software. A display having multiple rows, with one for each task or interrupt level, is provided. Along a time line, an indicator shows the status of each program, with icons indicating events and any change in status.

30 Claims, 14 Drawing Sheets

U.S. PATENT DOCUMENTS

| | | | |
|---|---|---|---|
| 5,133,075 | 7/1992 | Risch | 395/800 |
| 5,142,679 | 8/1992 | Owaki | 395/700 |
| 5,153,886 | 10/1992 | Tuttle | 371/361 |
| 5,157,782 | 10/1992 | Tuttle et al. | 395/575 |
| 5,159,669 | 10/1992 | Trigg et al. | 395/159 |
| 5,182,806 | 1/1993 | McKeeman et al. | 395/700 |
| 5,200,888 | 4/1993 | Hashimoto | 364/400 |
| 5,210,859 | 5/1993 | Aoshima et al. | 395/575 |
| 5,212,792 | 5/1993 | Gerety et al. | 395/650 |
| 5,255,385 | 10/1993 | Kikuchi | 395/575 |
| 5,265,254 | 11/1993 | Blasciak et al. | 395/704 |
| 5,291,497 | 3/1994 | Ulrich et al. | 371/19 |
| 5,295,222 | 3/1994 | Wadhwa et al. | 395/1 |
| 5,297,150 | 3/1994 | Clark | 371/19 |
| 5,301,325 | 4/1994 | Benson | 395/700 |
| 5,301,348 | 4/1994 | Jasahelainen | 395/183.22 |
| 5,321,838 | 6/1994 | Hensley et al. | 395/700 |
| 5,325,529 | 6/1994 | Brown et al. | 395/704 |
| 5,325,530 | 6/1994 | Mohrmann | 395/700 |
| 5,335,342 | 8/1994 | Pope et al. | 395/575 |
| 5,343,409 | 8/1994 | Satterfield | 364/514 |
| 5,347,518 | 9/1994 | Lee | 371/19 |
| 5,347,647 | 9/1994 | Allt et al. | 395/183.13 |
| 5,371,878 | 12/1994 | Coker | 395/500 |
| 5,371,883 | 12/1994 | Gross | 395/575 |
| 5,375,125 | 12/1994 | Ashima et al. | 371/19 |
| 5,390,325 | 2/1995 | Miller | 395/575 |
| 5,414,836 | 5/1995 | Baer et al. | 395/575 |
| 5,418,941 | 5/1995 | Peters | 395/575 |
| 5,426,648 | 6/1995 | Simamura | 371/19 |
| 5,438,673 | 8/1995 | Court et al. | 395/500 |
| 5,450,586 | 9/1995 | Kuzara et al. | 395/704 |

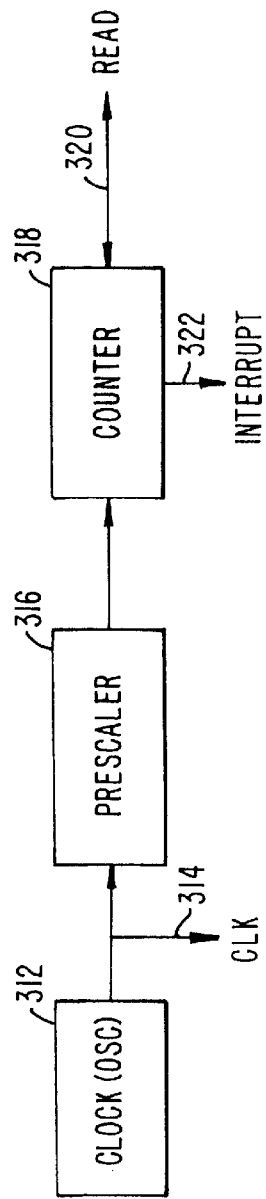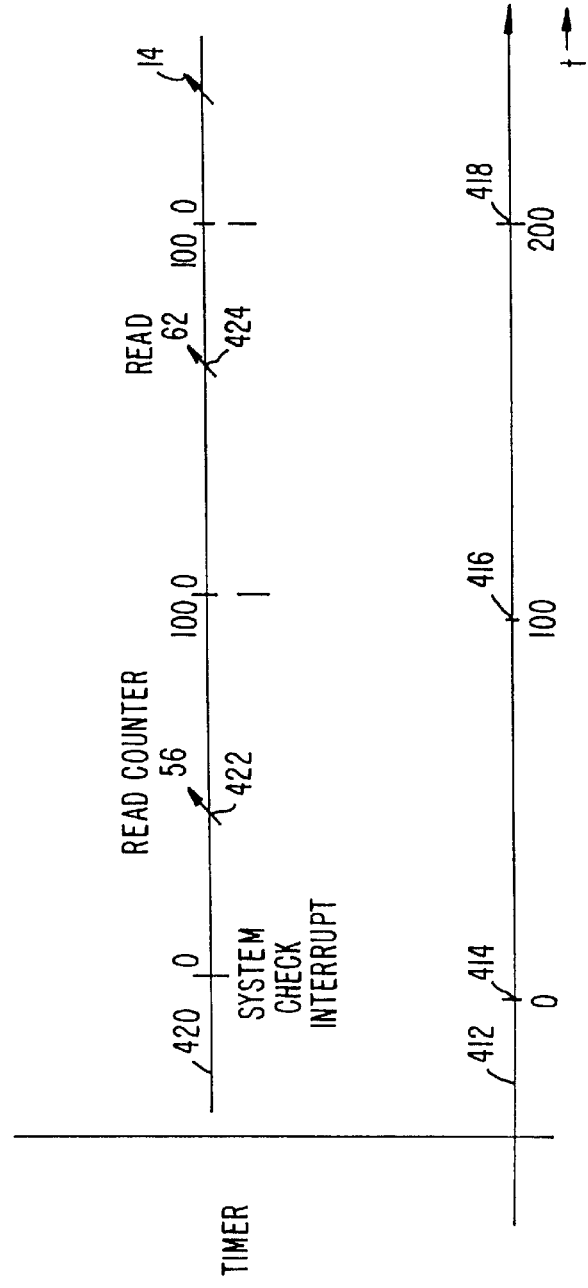

EVENT BUFFER — 510

| EVENT | COUNTER VALVE | TIME |
|---|---|---|
| Sem Give | 0002 | 2 |
| Sem Take | 0011 | 11 |
| ngRx | 0021 | 21 |
| SRollover (512) | | 100 |
| Sem Take | 0005 | 105 |
| Rollover (514) | | 200 |
| Sem Give | 0021 | 221 |

FIG. 5.

| FIG. 10A. |
| FIG. 10B. |

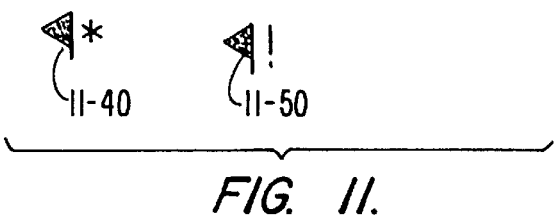
FIG. 11.
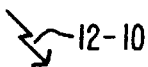
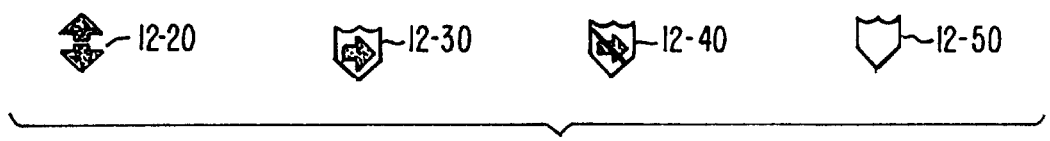
FIG. 12.
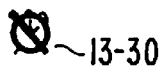
FIG. 13.

LOGIC ANALYZER FOR SOFTWARE

RELATED APPLICATION

This application is a continuation-in-part of related U.S. application Ser. No. 08/378,858, filed Jan. 24, 1995, now abandoned

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to instrumentation of software performance, in particular real-time, embedded or multi-tasking software running on a target computer being monitored by a separate, host computer. As used herein, target and host computer could refer to target and host programs or suites of programs running on a single computer.

There are many applications where software needs to exert real-time control. Examples of this are control systems for aircraft, factories, automobiles, printers, broker transaction computers, etc. A typical implementation would have a dedicated target computer which controls the aircraft, factory, etc., with target software on the target computer. This computer could be uplinked via a TCP-IP ethernet link, linked, networked or otherwise connected to a host computer. This could be a Unix®-based workstation or a Windows®-based PC, for example. The host can be used to download and configure the software which will run on the target computer, and customize such software.

Today's tools for developing complex real-time and embedded target applications are inadequate. They have two main deficiencies. First, the tools do not provide enough visibility into the target application under development. Second, the access and presentation of what information the tools do provide is clumsy and crude.

The problem of application visibility is that a developer needs powerful tools for exploring the construction and execution of complex applications. Although tools such as source browsers and cross-references are increasingly available for exploring the static construction of a target application, there are still only primitive facilities for obtaining dynamic information about the actual execution of the application. For example, it is not unusual to be able to obtain snapshots of the state of various pieces of the system. However, there are not many tools which capture and present sequence or timing information, or interactions between components in the system. This dynamic is precisely the information which is critical in real-time systems.

The problem of presentation is that the interface to the limited information which is available is tedious and low-bandwidth. A user may need to repeatedly type commands, remember and type names and numeric identifiers, display lists with large numbers of names and numbers which must then be deciphered, etc. A user would have trouble displaying different pieces of relevant information simultaneously, as the results of previous commands scroll off the top of the display. When a target application has dozens of tasks, hundreds of semaphores, message queues, timers, etc., the inadequacy of such an interface is clear.

The architecture of typical target computers, among other things, prohibits an easy solution. Development tools are generally resident in the target computer. However, the memory of the target computer is often limited, and the tool developer is constrained by considerations of program size and memory utilization. GUI-based tools are particularly difficult.

It would be useful to be able to use the host computer to increase the visibility of the target application by monitoring what is happening in real-time on the target computer, especially for debugging and benchmarking purposes. Because the target computer is performing a real-time function, any such monitoring should minimize the intrusion on the target computer software. In addition, it is desirable to minimize the amount of data which needs to be uploaded. Uploading extensive amounts of data can also interfere with the control of the software. Finally, it would be desirable to significantly increase the accessibility and presentation of the monitored information by displaying such information in a manner which is easily grasped and usable by a user, such as a technician performing maintenance on or monitoring or debugging the target software.

Systems have been proposed which show in graphical form which of multiple tasks are performing at different times, such as through the use of a bar graph which indicates by the bar which task or program is running. An example of such a system is the Arts real-time scheduler analyzer/debugger from Carnegie Mellon University.

SUMMARY OF THE INVENTION

The present invention logs events which occur in the target software, and stores these in a buffer for periodic uploading to a host computer. Such events include context switching times of particular software tasks, and task status at such context switch times, along with events triggering such a context switch or other events. The host computer reconstructs the real-time status of the target software from the limited event data uploaded to it. The status information is then displayed in a user-friendly manner. This provides the ability to perform a logic analyzer function on real-time software. A display having multiple rows, with one for each task or interrupt level, is provided. Along a time line, an indicator shows the status of each program when it is not running (in addition to when it is running), with icons indicating events and any change in status.

The task status is indicated with different line patterns or stipples, such as a wavy line indicating that a program is ready to run, a dotted line indicating that a program is waiting for a semaphore or a message from a message queue that it needs to run, and a dashed line indicating the program is waiting for a time-out. This graphical interface provides a simple and easily understood overall representation of the status of a target software. In addition, the use of unique icons at events allows a user to easily identify the events causing the change in flow of the program. The user can then select such a displayed icon to obtain more detailed information. For example, a user can obtain a time-stamp provided for each event. This provides a very powerful and simple debug and analysis tool.

The invention also provides methods and apparatus for obtaining timing information based on high-resolution timers. Detailed monitoring of real-time application performance, for example, requires such high-resolution timing information.

The invention allows a user to detect race conditions, deadlocks, CPU starvation and other problems related to task interaction. The responsiveness of the software can also be measured. Cyclic patterns can be detected. A post-mortem analysis of failed systems showing events leading up to the failure, rather than simply the state at the time of the failure or a debugging breakpoint, is possible with this invention. The invention is also useful for quality analysis and testing.

The present invention is also useful for embedded software. Regardless of the embedded software is real-time, the user embedded software has a need to monitor it. Embedded software is not often easily accessible, yet it is desirable to know how it is functioning for debugging, benchmarking and other purposes. Another application where a logic analyzer function would be beneficial is for multi-threaded or multi-tasking software. A snapshot at a given time, such as on failure, of the system is of limited usefulness where different tasks are swapped in and out. A history of what has occurred, which the present invention provides, is a very useful and powerful debugging and post-mortem analysis tool.

In one configuration, the present invention also uniquely uses a single timer to simultaneously generate timing events such as system clock interrupts, and a time stamp. The time stamp is also provided with extended precision through the combination of an interrupt for the system clock, and a read of the clock counter. Time skew is minimized by using a second clock to reset the system clock counter in some configurations.

While application programs are suspended during operations inside the operating system kernel, events occurring during kernel operation are given a single time stamp since they only have one effective time as far as the application programs are concerned. This simplifies the operation, minimizing the instrumentation intrusion and minimizing the amount of data needing to be stored.

The present invention also provides hooks into the kernel of the operating system to allow for instrumentation. Instrumentation can be dynamically configured, by essentially providing a hook to go and execute instrumentation software and then return to the kernel. There is also provision for users to define customized events, and icons corresponding to these, to be displayed for a particular usage. The user definition and re-configuring is aided by the use of instrument subclasses in an object-oriented operating system structure.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a block diagram of a hardware timer used by the present invention.

FIG. 4 is a timing diagram showing system clock and precision time stamp generation.

FIG. 5 is a diagram of an event buffer.

FIG. 11 shows event icons of unique semaphore actions.

FIG. 12 shows event icons of the present invention.

FIG. 13 shows event icons of the present invention.

DESCRIPTION OF THE PREFERRED EMBODIMENT

Figure 1:
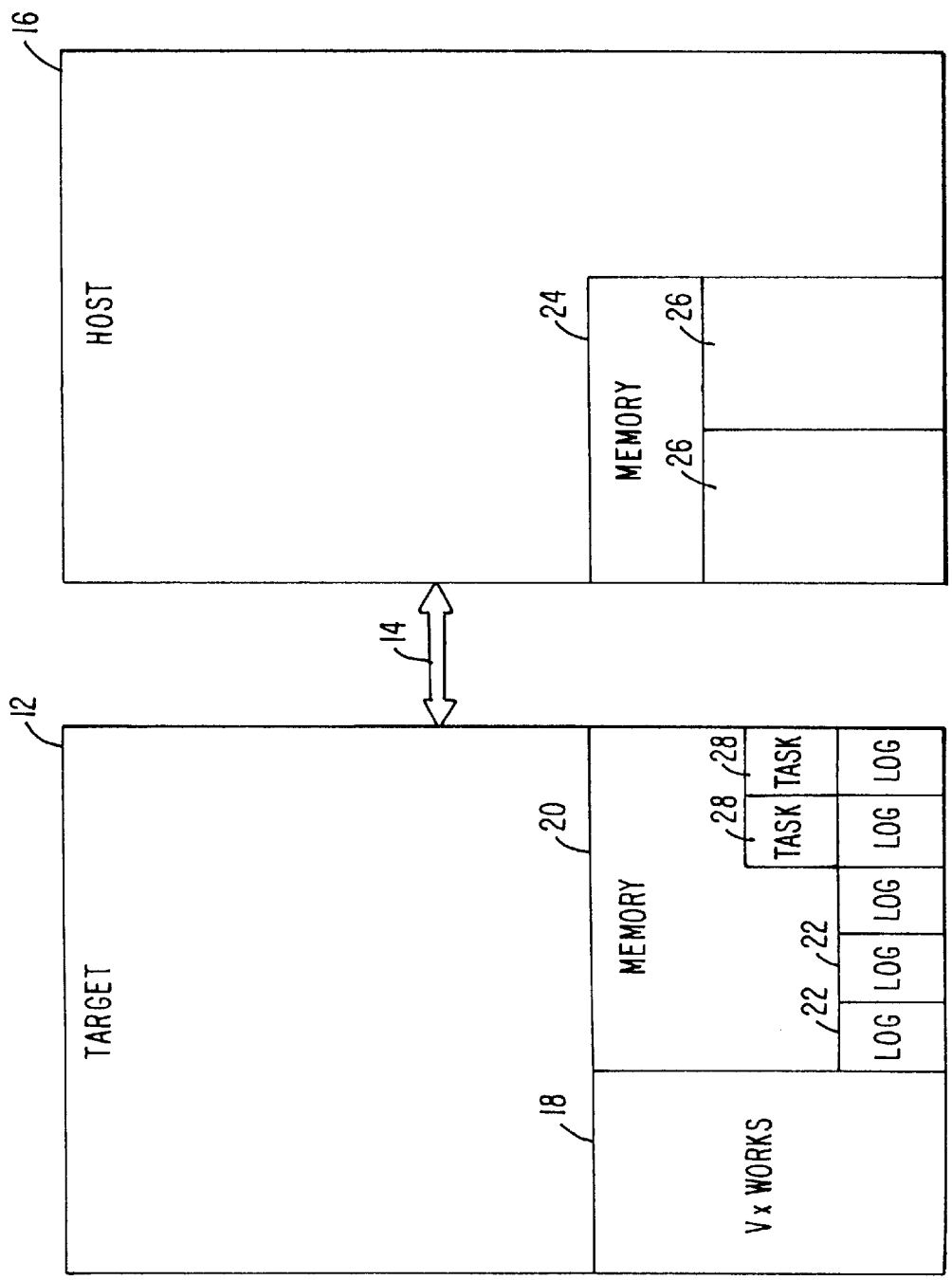
FIG. 1 is a diagram of a target and host computer according to the present invention.
Figure 2:
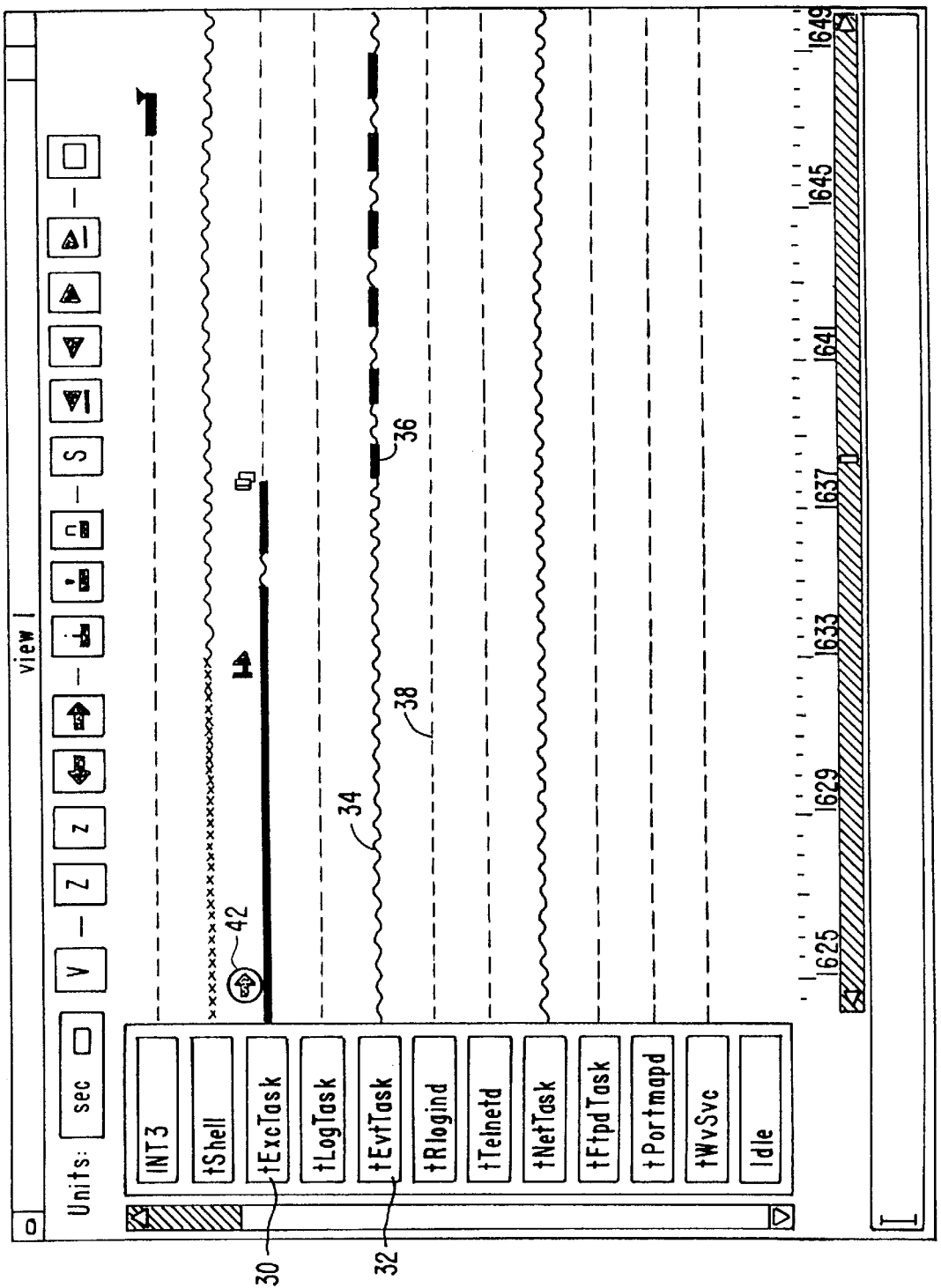
FIG. 2 is a diagram of the display graphics of the present invention.

TABLE OF CONTENTS
Overview
1. Program Status
2. Icons
3. Event Logging
4. Extended Precision Time Stamp
5. Dual-Purpose Timer
6. Timer Reset
7. Kernel Time Stamps
8. Object Instrumentation
9. Dynamic Instrumentation
10. Kernel Hooks
11. Capture Log for Postmortem
12. User Defined Events
13. Reconstruction of Target State on Host Overview FIG. 1 illustrates a target computer 12 connected via a link 14 to a host computer 16. The target computer includes an operating system 18, such as the Vxworks® system of Wind River Systems, Inc. A memory 20 includes a buffer for storing logs of events 22, which are periodically uploaded to host 16 via link 14. Host 16 includes a memory 24 with reconstructed data fields 26. Data fields 26 are reconstructed from the event logs 22 to provide the status of different tasks running with the Vxworks® 18. These different tasks are stored in memory 20, indicated as tasks 28, and are run as needed.

Link 14 is preferably an ethernet link, using TCP-IP protocol. Alternately, link 14 can be a connection over an in-circuit or ROM emulator, a serial line or any other point-to-point communication means known. Host 16 is typically a workstation running a Unix® or Unix®-based operating system, or a PC running Windows® operating system.

The significant events 22 which are logged include switching from one task 28 to another, a change in the state of a task, or certain events which the user desires to display on a debug display. Target computer 12 could be a separate traditional stand-alone computer, or could be an embedded computer board that is plugged into a car, printer, etc.

In addition to the target-and-host structure set forth above, aspects of the present invention are useful where a single computer runs both the target and host software. An example is a multi-tasking environment running on a workstation with plenty of power and memory. The uploading bandwidth is not a constraint in this environment, but the lack of intrusiveness and the ability to provide the status and event display are very useful.

1. Program Status.

Figure 9:
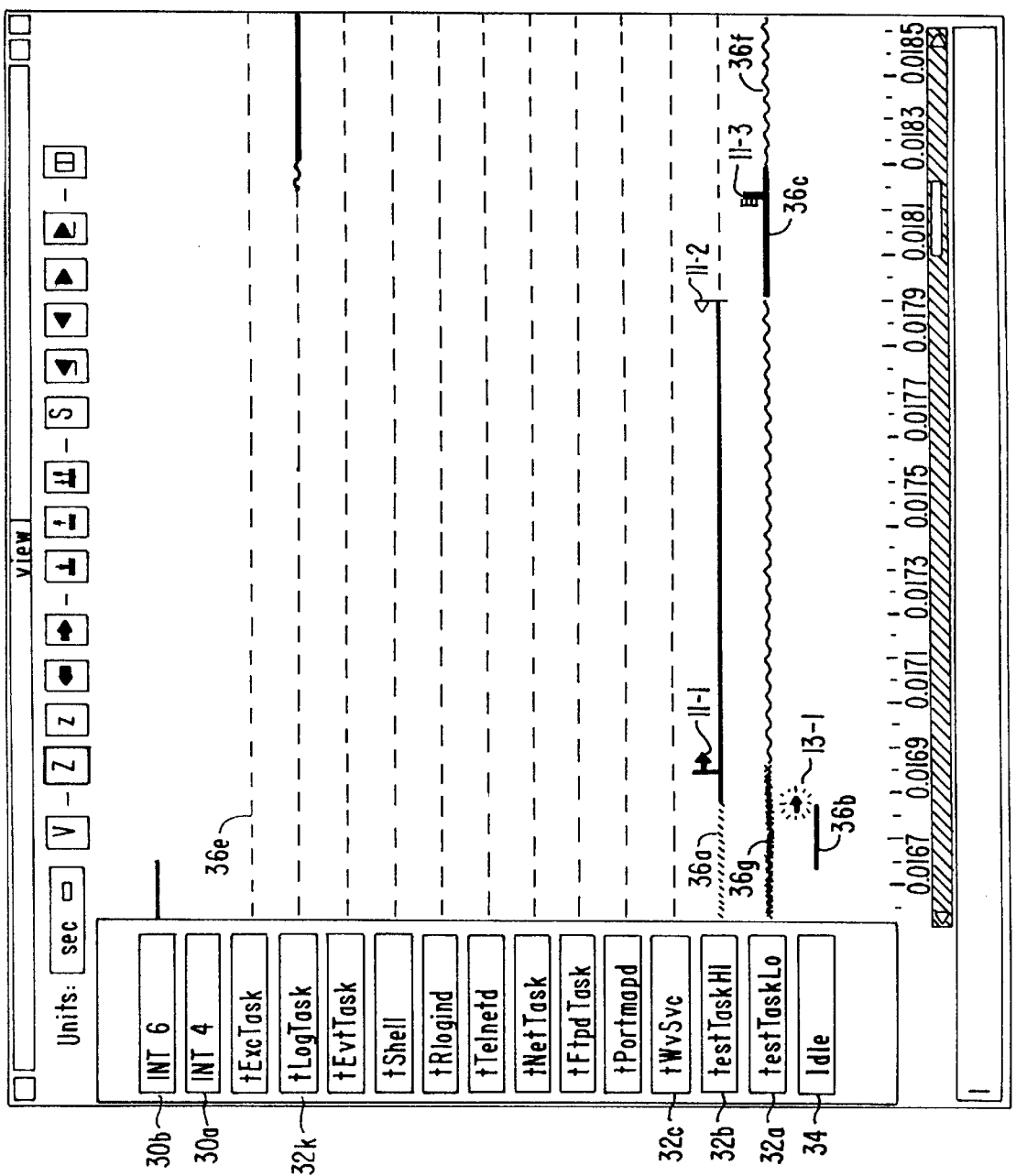
FIG. 9 is an example of the main display of the present invention.

FIG. 9 shows an example of the main display used by the present invention. Along a vertical axis are indicated tasks or interrupt service routines (ISRs), such as tasks 32 and ISRs 30. The horizontal axis is a time line, with information displayed along the time line for each program. FIG. 9 shows the state of each task 32 at a particular time. FIG. 9 also shows when the system is executing a particular ISR.

FIG. 9 also shows a representation of the "idle loop" 34. Not actually a task or an ISR, the idle loop is the code which the kernel executes when there are no tasks ready to execute and no interrupts to service. In this loop, the kernel typically services interrupts as they arise and continually checks to see if a task is ready to run. A representation of the idle loop along with the tasks and ISRs is useful in that analyzing the amount of time a system is idle can help the user fine tune the application(s). Too much time may in the idle loop may mean the application(s) is not using the CPU efficiently. Too little time may mean that the application is interrupted too often to run efficiently.

Task states include "delayed," "executing," "inherited," "locked," "pended," "ready" or "suspended." A task is delayed if it has been explicitly directed to pause for an amount of time. A task or ISR is executing if the task or ISR has control of the processor. In a preferred embodiment, for a task to be in the executing state, there must be no interrupts to service, the task must be the highest-priority, ready task in the system, and there must be no other tasks with preemption locking enabled. ISRs are in the executing state after their interrupt has been acknowledged by the kernel. If there is more than one ISR to service, the one at the processor's higher interrupt level executes. The idle loop is in the executing state when there no tasks to run and no ISRs to service.

Each task has a "priority" which indicates that task's eligibility to control the CPU relative to the other tasks in the system. A task is in the inherited state when its priority has been increased because it owns a mutual exclusion semaphore that has priority inheritance enabled and a higher-priority task is waiting for that semaphore. Priority inheritance is a solution to the priority inversion problem: a higher-priority task being forced to wait an indefinite period of time for the completion of a lower-priority task. For example, assume that task 30 needs to take the mutual exclusion semaphore for a region, but taskLow currently owns the semaphore. Although taskHi preempts taskLow, taskHi pends immediately because it cannot take the semaphore. Under some circumstances, taskLow can then run, complete its critical region and release the semaphore, making taskHi ready to run. If, however, a third task, taskMed, preempts taskLow such that taskLow is unable to release the semaphore, then taskHi will never get to run. With the priority inheritance option enabled, a task, such as taskLow, that owns a resource executes at the priority of the highest-priority task pended on that resource, the priority of taskHi in the example. When the task gives up the resource, it returns to its normal priority.

The scheduler and the task preemption it performs can be explicitly disabled and enabled on a per-task basis with lock and unlock routines. When preemption locking is enabled for a task, the scheduler never preempts that task on the basis of priority, unless the task explicitly pends or suspends. When the preemption-locked task unpends and begins running again, preemption is again not performed. Preemption-locked tasks are still subject to interrupts.

A task is in the pended state if it attempted to obtain an object but the object was not available. For example, if a task attempts to take a semaphore or to receive a message from a message queue but the semaphore or a message is not available, then the task pends on the semaphore or message.

A task is ready if it is not waiting for any resource other than the CPU. Thus, the task is ready to execute, but is not the highest-priority, ready task in the system.

Task suspension results in the prevention of task execution. However, state transitions for the task still occur. If a task was in a state other than executing or ready before it was suspended, the task will still be in that state. For example, a delayed task which is then suspended becomes both delayed and suspended. When the time of delay expires, the task would transition to a ready state but transitions to a suspended (only) state instead.

As FIG. 9 shows, initially most of the tasks 32 are in the pended state, as indicated by pended state stipple 36e. Task 32b, however, is delayed, as indicated by delayed state stipple 36a, and task 32a is suspended, as shown by suspended state stipple 36g. Along the time axis, ISR 30b running at interrupt level 6 executes and services an interrupt, after which the CPU is idle awhile. The execution of ISR 30b and the idle loop 34 is indicated by executing state stipple 36b. The passage of time exceeds the amount of time for which task 32b was delayed, and task 32b transition to the executing state. Task 32b now resumes suspended task 32a, and task 32a transitions to the ready state, indicated by ready state stipple 36f. Task 32a begins execution and becomes locked against preemption, as indicated by locked state stipple 36c.

Other task states which could be displayed to the user include "dead," "nonexistent," and "unknown." A task is dead when all the system resources (including the task identification number) which it controls or consumes become available for another task initialized at some later time. A task is nonexistent before it has been initialized or spawned. A task is said to be unknown if, during post-mortem analysis, no context switch has yet occurred for the task. Post-mortem analysis is described below.

2. Icons

The invention uses different event icons to indicate the occurrence of different noteworthy events during the execution of a system. With certain exceptions, an event icon is a combination of a category graphic and a action graphic, as explained below.

An "event" is any action undertaken by a task or an interrupt service routine that provides information or affects the state of the real-time system. Examples of events are semaphore gives and takes, task spawns, and deletions, timer expirations and interrupts.

Figures 10, 10A:
FIG. 10 shows the relationship of FIG. 10A to FIG. 10B.
FIG. 10A shows event icons of the present invention.
Figure 10B:
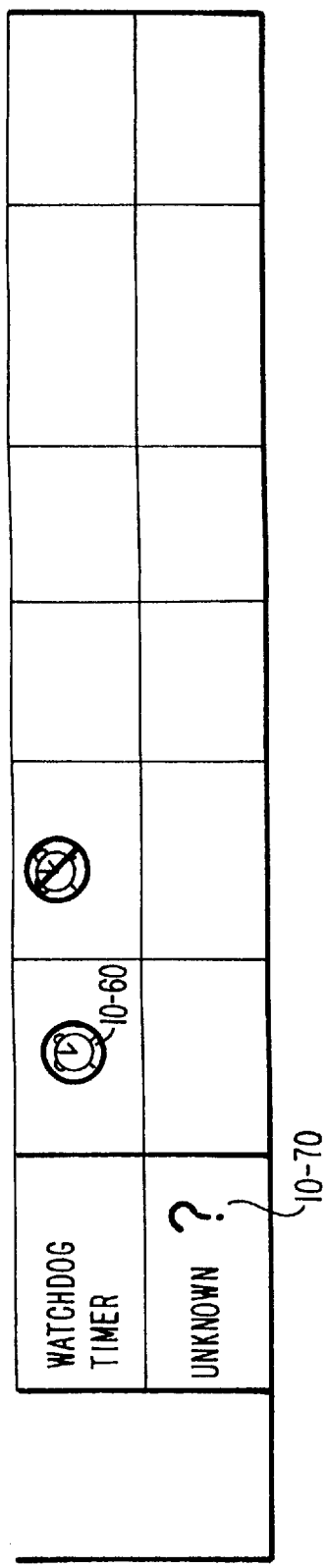
FIG. 10B shows event icons of the present invention.

Events fall into categories such as the following: exception and ISR; message queue; semaphore; signal; task; tick; user event; watchdog timer and unknown. Each one of these categories has a category graphic symbolizing that category. Accordingly, FIGS. 10A and 10B show the category graphics for the above-listed categories in one preferred embodiment. The category graphic for message queues is pages of writing 10-10, and the category graphic for semaphores is flag 10-20 akin to that used in, for example, ship-to-ship semaphoring. For signals, the category graphic is thin broken arrow 10-30; for tasks, thick arrow 10-40; for a tick, sound splash 10-50; for user events, chevron 10-55; for watchdog timer events, alarm clock 10-60; and for unknown events, question mark 10-70.

Orthogonal to event categories are event actions: creation, deletion, giving, taking, suspension and resumption, for example. Each event action has its own action graphic, which can be displayed simultaneously with appropriate event category graphics. In a preferred embodiment, for the creation event action, the action graphic is circle 10-80, for deletion circle 10-90 with a line through it, and for giving shading or emboldening, as indicated with event icon 10-1. For receiving, the category graphic is left unaltered. Suspension and resumption are shown as vertical bar 10-100. FIGS. 10A and 10B show the crossing of action graphics with category graphics to produce event icons.

The exceptions are as follows: In a preferred embodiment, the exception and ISR category has three event actions: generating an exception, entering into an ISR and exiting from an ISR. The respective event icons are a bomb for program error, a triangle with apex upward for entry into an ISR, and a triangle with apex downward for exit from an ISR.

Also, semaphore events and thus semaphore event icons have a third dimension, the type of semaphore. In a preferred embodiment, the semaphore can be binary, counting or mutual exclusion. A binary semaphore may be viewed as a cell in memory that can be full or empty. A binary semaphore is useful for both mutual exclusion and synchronization. A counting semaphore is similar to a binary semaphore except that a counting semaphore keeps track of the number of times the semaphore has been given. Every time the semaphore is given, the count is incremented; every time the semaphore is taken, the count is decremented. Any task which tries to take the semaphore when the count is zero makes a transition to the pended state. A mutual exclusion ("mutex") semaphore is a specialized binary semaphore designed to address issues inherent in mutual exclusion, including priority inversion, deletion safety and recursive access to resources. The behavior of a mutex semaphore is identical to that of a binary semaphore—except that a mutex semaphore is normally used only for mutual exclusion (not for synchronization), that only the task which took a mutex semaphore can give it; that an ISR may not give the mutex semaphore; and that a task may not flush a mutex semaphore. In a preferred embodiment, this third, type dimension of semaphore events is represented only on semaphore creation. FIG. 11 shows the three semaphore creation event icons: binary semaphore creation 11-10, counting semaphore creation 11-10 and mutex semaphore creation 11-30.

There are two events actions unique to the semaphore category: giving a mutex semaphore without restrictions and flushing a semaphore. When a mutex semaphore is given without restrictions, a task which sought to take that mutex semaphore, failed and pended will make a transition to the ready state. That task is either the first task or the highest-priority task, depending on how the semaphore was created. If no tasks are pending on the mutex semaphore, the semaphore becomes full. When a semaphore is flushed, all tasks pending on the semaphore make a transition to the ready state. FIG. 11 also shows the two semaphore event icons corresponding to these unique actions: mutex semaphore giving 11-40 and semaphore flushing 11-50.

A unique action for signals is signal handler entry. In a preferred embodiment, the action graphic for signal handler entry is arrow 12-10 of FIG. 12.

Unique actions for tasks include changing the priority of a task, delaying a task, making a task safe (or unsafe) from deletion and pending (or unpending) a task which is safe from deletion. The event icon for changing the priority of a task is double arrow 12-20, the upper arrow pointing up and the lower one pointing down. The event icon for delaying a task is a shading of the task category graphic. The action graphic for making a task safe from deletion is shield 12-30; the action graphic for making a task unsafe from deletion is shield 12-40 with a diagonal bar across it. The event icon for pending or unpending a task attempting to delete another task which is safe from deletion is emboldened shield 12-50.

In a preferred embodiment, tick events actions are initially limited to announcing the expiration of time. It is then the third dimension of tick events—the kind of timeout which has occurred—which distinguishes tick event icons. The types of timeouts include expiration of a time slice, expiration of a watchdog timer, expiration of a task delay and expiration of a task's timeout. FIG. 13 shows event icons for tick events. The type graphics for time slices, watchdog timers, task delays and task timeouts are percent sign 13-10, watchdog category graphic 10-60, task category graphic 10-40 and clapper bell 13-20, respectively.

Unique actions for watchdog timers include cancelling a watchdog timer. The watchdog cancellation action graphic is a diagonal bar. FIG. 13 shows watchdog cancellation event icon 13-30.

FIG. 9 shows some of the above-mentioned event icons in a multi-tasking scenario. At time 0.01685, the expiration of a task delay is announced, as indicated by event icon 13-1. The previously delayed task testTaskHi 32b is therefore set to run and does so. At time 0.01695, testTaskHi 32b resumes testTaskLo 32a. Accordingly at time 0.01695, task resume event icon 11-1 is displayed, and testTaskLo 32a ceases to be suspended. TestTaskHi 32b then attempts to takes a semaphore which is not available at time 0.0180. Semaphore take event icon 11-2 is displayed at that time, and testTaskHi 32b pends on the unavailable semaphore. The last event icon shown in FIG. 9 is message send event icon 11-3 at time 0.0182. There testTaskLo 32a sends a message from a message queue.

Figure 16:
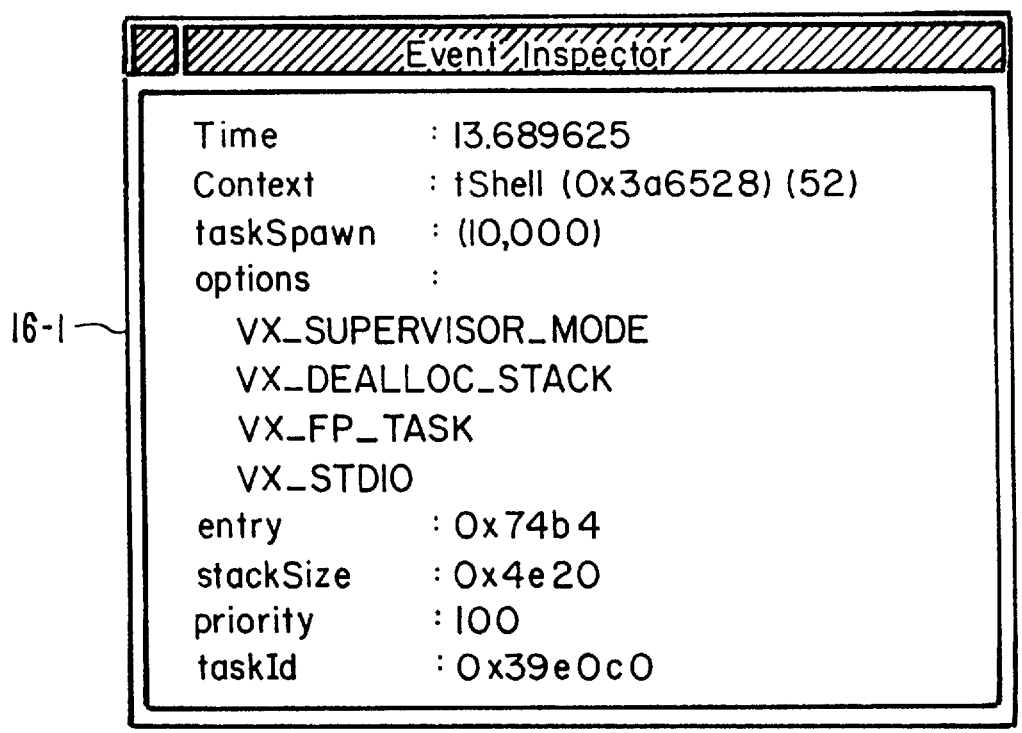
FIG. 16 shows an event inspection window displaying more information about an event.

In a preferred embodiment, a user may examine an event in more detail. The user can select an event icon by highlighting the event icon on the host display (using any known means of highlighting data on a screen, including selecting with a mouse, a light pen or even a finger) or by dragging the event icon to a designated inspection area on the host display. Once the user has so selected an event icon, the host will display information about that event. For example, when a task is spawned, a task spawn event icon is displayed. By selecting that event icon, the user can see more information on that event, e.g., its time stamp, its context identifiers, the event name, the options with which the task was spawned, the task's entry point, the stack size of the task, the priority of the task, the task ID, etc. While some of the information is visually represented on or inferable from the host graphical display, other of this information is not (e.g., entry point, stack size, ID). FIG. 16 shows event inspection window 16-1 displaying more information about a task spawn icon such as task spawn icon 10-40.

3. Event Logging

It is important to produce the information indicated above in a manner which is minimally intrusive on the operation of the target software. Minimally intrusive information production is particularly important for real-time operating environments. Thus, events are defined as any action which a task or an ISR explicitly undertakes which can affect the state of the system. Between events, the state of the system is assumed not to change. For example, the state of a task is determined only at the time of an event which affects the state of that program. The state is assumed not to change until the next event which could affect the state of that program. (The state need not change because of that next event.)

The target stores event information in the log buffer each time an event occurs. According to the paradigm of the invention, the target breaks away from the current instruction stream of the task, ISR or idle loop, copies data describing the event into the buffer and then returns to running the task, ISR or idle loop. However, a context switch may occur as a result of the logged event. In this circumstance, the target will resume execution in some other task or ISR—or even in the idle loop if it was not executing there before the event.

In a preferred embodiment, event logging is not started when the target is booted. Event logging is initiated by the user. When event logging is active, the amount of data generated, and thus the amount of time consumed by the generation and storage of the data depends on the event logging mode.

Normally, each event is logged with a time stamp and is displayed at the point in the display corresponding to that time stamp. However, when time stamps are not available, as when no timer hardware is provided or the hardware is not enabled, then all events are logged with an event sequence number. In a preferred embodiment, a sequential event driver tags events with sequence numbers which represent the order in which the events occurred on the target. The events are then spaced equidistantly from each other in the event display.

In a preferred embodiment, the event logging facility operates in one of three user-enabled modes: context switch, task state transition or object status. These three modes are differentiated by the amount of information logged for each event. The event logging modes are cumulative. If a higher mode is active, all lower-level modes are active as well. Object status mode is the highest level of logging. Context switch mode is the lowest. These three logging modes are described in turn below.

The lowest level mode, the context switch mode, involves all parts of the kernel which cause a context switch. (As indicated above, ISRs are deemed to run in a different context than the interrupted task and the idle loop is deemed to be a context.) The context switch mode also involves the parts of the kernel affecting the ability to switch contexts, e.g., task preemption and task creation.

The task transition mode involves all parts of the kernel which cause a task to change status. The task does not necessarily move in or out of the running state. Object status mode provides information about system objects, e.g., the count of a semaphore or the number of messages in a message queue.

Figure 15:
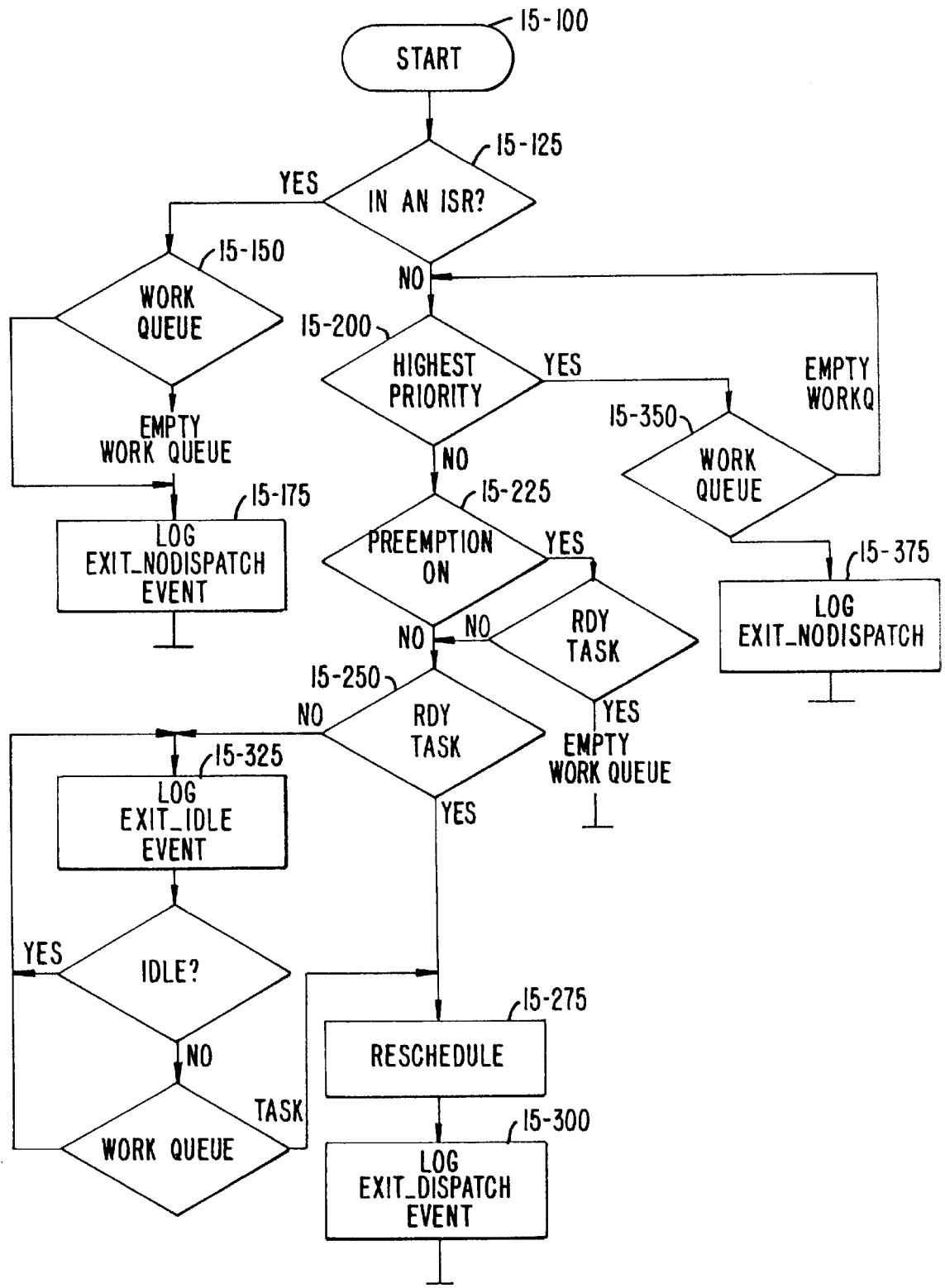
FIG. 15 is a flowchart of the eventpoints in an example kernel exit routine.

FIG. 15 is a flowchart of eventpoints in an example kernel exit routine. At step 15-100, the kernel exit sequence is begun. Step 15-125 is a check to determine whether the exit is on behalf of a task or an ISR. If on behalf of an ISR, the kernel checks the work queue at step 15-150 to determine whether any housekeeping activities need to be performed. On completing housekeeping as necessary, the kernel logs the fact that it is exiting without dispatching a task, step 15-175, and exits. If, however, the exiting is on behalf of a task, the kernel determines whether rescheduling ought to be performed at step 15-275. If the kernel determines that the current task is not the highest priority task, step 15-200, that the current task can be preempted, step 15-225, and that there is another task ready to run, step 15-250, then the kernel performs rescheduling, logs the fact that it is exiting on dispatching a task (step 15-300) and exits. If along the way, the kernel becomes idle, it logs this fact at step 15-325. The kernel will also log an exit-without-dispatch event at step 15-375 when the current task is the highest-priority task and there is no housekeeping to attend to.

In the instances where the kernel exits (with or without dispatching), the kernel must determine if priority inheritance is on and change the event logged accordingly.

The locking and unlocking of a task to prohibit and permit preemption, respectively, are also logged as events. It is important to display these events at the context switch level because they affect normal context switching.

Interrupt handler entry and exit are logged in the context switch mode as well. The event ID (discussed in more detail below) for interrupt handler entry is preferably the interrupt level added to a predetermined minimum interrupt event number. In this way, the event identifier for entering an ISR also contains information about the interrupt level.

The interrupt handler exit code differentiates between two events: exiting when the interrupt handler either contains no kernel work or executes outside of kernel state, on the one hand, and exiting when the interrupt handler has caused work to be added to the work queue or may have caused a task to be rescheduled, on the other hand. Because ISRs are considered in this invention to be different contexts than the tasks in which they are arise, switching from a task to an interrupt or vice versa are events which are properly logged in context switch mode.

Two timer events are logged in context switch mode. The first is the rollover of the timer. As explained fully below, the timing on the target can be followed by the logging of the rolling over of the timer. The second event is the expiration of a time slice, i.e., a tick.

Any start-up or other information essential to determining which context is the current context and to determining the ability of the target to switch contexts would be logged in the context switch mode. The logging of configuration information as events and the logging of task names at the start of instrumentation, both discussed below, are examples of such start-up or essential information. Also, the log can contain events indicating when instrumentation has been turned on or off and when switching occurs from one of the double buffers of the event log to the other in the preferred embodiment described below.

At the next higher level, the task transition mode, a preferred embodiment of the invention logs the changing of a task's status. In a multi-tasking environment, tasks communicate among themselves using different types of inter-task communication methods. A not unusual result of inter-task communication is that the state of the recipient task will change. Inter-task communications procedures include semaphores, message queues, signals and watch-dog timers. Of course, a task may directly change its status without any prior inter-task communication.

The kernel pend queue tracks tasks which are pended, i.e., waiting for a particular system object. Therefore, all changes of task status cause an interaction with the pend queue—except the suspended-to-ready and ready-to-suspend state changes. The kernel removes a task from the pend queue only if that task is either ready or suspended. Therefore, logging the pend queue-modifying events creates a record of a significant portion of task state transitions. Manipulation of the pend queue includes putting a task onto or getting a task off of the queue; flushing a constituent semaphore queue and terminating a constituent queue. However, these events are of themselves ambiguous. The kernel must log certain events to clarify the cause of a pend queue manipulation. The certain events include semaphores gives, takes and flushes; message sends, receives and deletes; signal pauses, suspends, kills and waits; and (otherwise undifferentiated) task acts that are followed by a pend queue action.

Some events indicate the state transition of a task not reflected in the pend queue. The task can, for example, be transitioning among the ready, suspended and delayed states. These state transitions are captured as separate events in the state transition mode. The spawning and deleting of tasks, the raising and lowering of the priority of a task, and the deleting of a semaphore and resultant unpending of tasks are also logged as separate state transition mode events.

Timer events in the task transition logging mode are of two types: clock tick events and watchdog timer events. The kernel generates clock tick events in the ISR of the system clock interrupt. The ISR determines whether a task pended on a system object has timed out, whether round robin scheduling is on (and a timer slice has expired) or whether a watchdog timer expires, and the ISR logs an identifying event. The starting and cancelling of a watchdog timer are the watchdog timer events.

Finally, the object status event logging mode is the most detailed logging mode. As discussed below, the user may turn on object status mode on a per-object basis, on a per-object type basis or on all objects of all types in the system. Object status mode eventpoints may be placed anywhere in the kernel code, provided that each of the object status mode eventpoints precedes its equivalent level two (i.e., task state transition) eventpoint. Task events in object status mode include creating, deleting, delaying, setting the priority of, suspending and resuming tasks, as well as making tasks safe from deletion and making tasks deleteable. Events in the object status mode also include pending or unpending a task which is attempting to delete a task safe from deletion. Semaphore events in the objects status mode include creating a binary, counting or mutex semaphore; deleting, giving or taking a semaphore; flushing all tasks pended on a semaphore; and giving a mutex semaphore with force.

Watchdog timer events include creating, deleting, starting and cancelling a watchdog timer. Message queue events include creating, deleting, receiving and sending a message. Signal events in the object status mode include setting a signal handler, suspending or pausing a task until signal delivery, sending a signal to a task and executing in a signal handler.

Each event as logged has a fixed format: an event ID, followed by a parameter array. Some events have a time stamp between the event ID and the parameter array. An event ID is a fixed-length identifier uniquely determining the type of event the log entry represents. The target and host are in agreement as to the fixed-length and as to which specific event IDs represent which specific events.

The time stamp is a fixed-length identifier indicating the time at which the event was logged. Again, the target and hosts agree as to the length of a time stamp and the format of the time in the time stamp field. In the interest of optimization, the time stamp field may be omitted for certain events as described below.

The third component of an event log entry is a parameter array of variable length. The length of the array is determined by the type of event and therefore the amount of information which must be recorded to log that type of event. The need for the target and host to agree as detailed above now becomes clear: The host can impose structure onto the otherwise undifferentiated byte stream of the log which the target is generating.

Also, in a multi-tasking environment preferred embodiment, all logging to the event buffer are interrupt locked. Most preferably, each eventpoint will lock out only such interrupts as necessary to insure the integrity of the data to be logged.

All context switch logging routines store a time stamp. However, task state transition event logging routines do not store a time stamp. The timing of a state transitions is approximated by reference to the time stamp of the following context switch event. As the above discussion indicates, a level two task state transition event always precedes a level one (timestamped) context switch event.

In a preferred embodiment, the event buffer is implemented as a double buffer. Such a scheme allows the uploading and emptying of the first buffer to the host to proceed asynchronously with event logging into the second buffer. There is, therefore, no delay in the target pending the availability of a (once full) buffer for logging. An event task is dedicated to emptying the buffer. Event logging must take into account that this task must be switched in and that switching itself generates data for the buffer.

Information such as the cpu type and name of the target can be provided in a separate configuration event log entry. When instrumentation is turned on, a series of a particular event type can identify all the tasks running at the time instrumentation was turned on. While this information is available through events such as task creation and spawning, with instrumentation off, no event log record would have been kept of that data.

4. Extended Precision Time Stamp

The present invention is designed to work with target computer boards which may have varying timer configurations. The invention may use the existing clocks and counters on the target hardware for timing information. Alternately, it can run with clocks and timers provided by external hardware or without any clocks and timers at all. In configurations where existing counters are used, boards will typically have at least two clocks with associated counters for providing basic clock information. An example of such an arrangement on a hardware board is shown in FIG. 3. Oscillator 312 provides a basic clock signal 314 used by the hardware board and by the CPU. This clock signal can be provided to an optional circuit, prescaler 316. The clock signal is in any event provided to counter 318. The count in counter 318 can be read at any given time on read input 320. In addition, counter 318 is pre-loaded with a value at which it will roll over, generating an indication of the rollover each time. This rollover indication is provided on interrupt line 322. The CPU uses this interrupt as a system clock or a general indication that a rollover has occurred. The system clock is basically an automatically generated periodic timer interrupt which can be used for various timing functions.

The preferred resolution of oscillator 312 for real-time systems is 10 microseconds or less. If the clock signal output is slower than 100 kHz, some instrumented kernel events may not have distinguishable timing information. The minimum suggested width of counter 318 is sixteen bits, though of course, counter 318 can have fewer bits. However, the preferred width of counter 318 is 24 or 32 bits. The wider a counter, the less often it must roll over, and, therefore, the less system overhead its ISR incurs. The input frequency can also be higher with a wide counter, which yields more accurate timing information. The period of the time stamp timer, the product of oscillator 312's resolution and counter 318's maximum count, should be at least 10 msecs. If rollovers are more frequent, the overhead of servicing the rollover interrupt may be too intrusive. The greater the period, the better.

FIG. 4 illustrates how precision timing information is obtained for events which are to be time stamped. A first line 412 shows the occurrence of the rollover interrupt or system clock, which occurs at points 414, 416 and 418. By way of example, each interrupt may be done at a count of 100, thus indicating at point 414 a value of 0, at point 416 a value of 100, and at point 418 a value of 200. This interrupt time can be noted to indicate a time position of a particular event. To obtain more precision, the counter itself is read. The counter time is indicated on line 420 of FIG. 4. As can be seen, at the times corresponding to 414, 416 and 418, the counter is reset each time, and thus counts up to 100 each time. Thus, the intervals in-between the interrupts are always valued between 0 and 100. For example, at a point 422, the value may be 56. Thus, a read at this point generates a precision time stamp of 56, plus the rollover interrupt period which is 0, giving it an absolute value of 56. Similarly, in the next period, a read of the counter at a point 424 produces a value of 62. Combined with the rollover interrupt period information available from point 416, which is 100, this gives an absolute precision time of 162 for the time stamp.

FIG. 5 illustrates the organization in a buffer of different events recorded by the present invention and how the time stamp information is assembled. Particular events are recorded in buffer 510. With the data describing those events a counter value is stored, from the reading of counter 318 on lines 320 to give the values indicated by line 420 of FIG. 4. The rollover value is not stored with the counter value, merely the count within any counter rollover period.

Subsequent events are recorded in the same manner. A counter rollover interrupt itself is recorded as an event, as indicated by entry 512. Since this is assumed to be a count of 100 for the counter value, the counter need not be read, and no counter value is stored. A subsequent counter rollover 514 is also shown.

When the buffer is read by the host to analyze the events, the host can determine the time in an absolute sense from looking at the location of the rollover events and the counter values. For example, the first three entries in buffer 510 in FIG. 5 would have absolute values of 2, 11 and 21. The fifth entry, with a counter value of 5, would have an absolute value of 105, since it follows the first rollover event 512. The final event entry shown with a value of 21 would have an absolute value of 221, since it follows the second rollover event 512. This system provides a method for providing an extended precision which minimizes the need to actually read a counter and also minimizes the information to be stored in a buffer and uploaded to the host for analysis.

The reading of the counter value takes some processing time, and accordingly there is a desire to minimize this. The present invention minimizes this by not reading it for certain events which don't require a time stamp, such as a rollover event. Other events may not require this high precision. In addition, events which occur in a host kernel operation need only a single time stamp, as discussed below.

5. Dual-Purpose Timer

As discussed above, counter 318 of FIG. 3 is used to generate a rollover interrupt 322. In some configurations, the present invention piggy-backs on the rollover event, using it as a system clock in addition to using it to generate the time stamp. Thus, instead of reading a separate counter for the high precision time stamp, the present invention reads the count between the system clock interrupts. This information can then be combined with the location of the system clock, as discussed above, to generate the total time stamp information. This consolidates the use of available resources and eliminates the need for a second counter and sending up a rollover event.

6. Timer Reset

Certain types of counters present on existing hardware boards introduce timing skew when they are read. A modern counter used for counter 318 of FIG. 3 would have an on-board register, with the count being loaded into the register each time. Thus, the register can be read without interfering with the counter itself. However, many older counters require that the counter be disabled in order to read the value of the counter. During the time in which the counter is disabled, it is not counting, introducing timing skew. In order to read the counter, the CPU must send an instruction in a first clock cycle to stop the counter, and then read the counter in another clock cycle, and restart the counter in a yet another clock cycle. Thus, at a minimum, there would be a three clock cycle skew. The number of clock cycles required to do these operations may vary.

In addition to the instructions needed to read the counter itself, the CPU must first execute instructions to lock out interrupts. This is crucial, because an interrupt could otherwise be delivered to the CPU after it has stopped the counter, and the CPU would immediately switch to instructions handling the interrupt, thus further extending the skew period while the counter is stopped.

Figure 6:
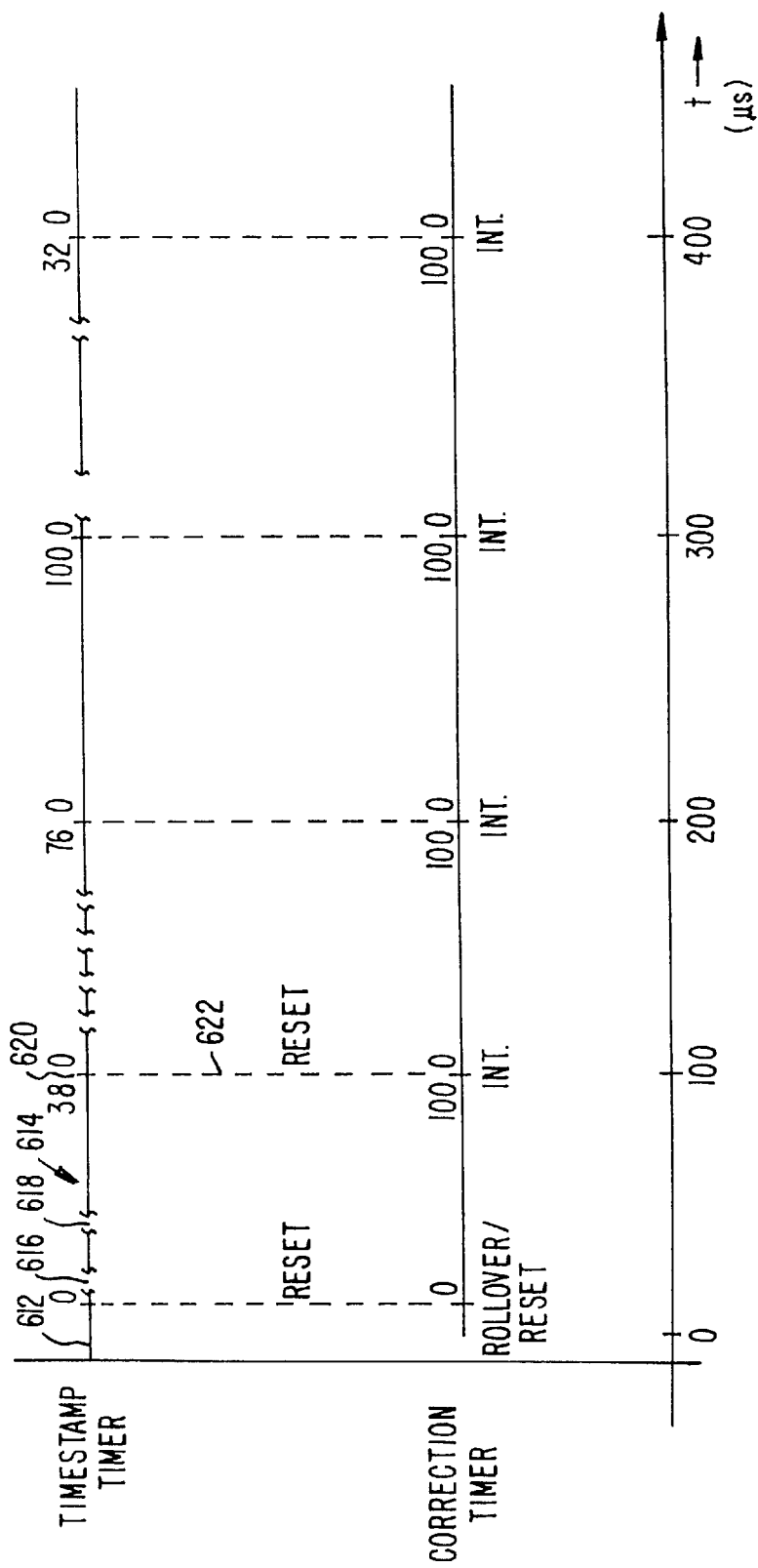
FIG. 6 is a timing diagram showing counter reset to avoid timing skew.

FIG. 6 illustrates the effect of such skew. Line 612 shows the times of the timer output. Assuming the interrupt for the system clock is generated every 100 counts, a first period 614 shows two reads of the counter at points 616 and 618. Assuming, for example, that each of these reads introduces a six clock cycle skew, when the timer reaches a point at which it should be generating a system clock for the count of 100 at a point in time 620, the count will in fact be 88 due to the skew introduced.

A first approach to reading the time stamp counter and avoiding skew is to reset the counter to a value of 100 at a point in time 620, and corresponding times for subsequent periods of 100. Since the counter for the time stamp clock is disabled while it is being read, it cannot be used to generate the reset signal. Thus, a separate clock on the board must be used to generate the reset signal 622. Typically, a hardware board will include at least two counters, and often have more. One of the counters will be designated, according to this invention, to provide the rollover event interrupt, and also provide that signal as a reset signal to the second counter. The first counter is never read, since reading it would introduce skew into that counter, and it is desirable to have an accurate count which is reset every 100 or other period of clock cycles. As can be seen, skew still accumulates during each period of 100 cycles, but the resetting prevents skew from accumulating from one period of the rollover interrupt to another, thus limiting the amount of cumulative time skew.

The selection of the period of the first timer must balance a short period's increased interrupt service rate with a long period's noticeable time skew accumulation. The chosen period should be based on the amount of time skew that can accumulate, which is related to how often the time stamp facility is called and to the sensitivity of the application using the facility. Our experience is that a correction period of 100 to 150 msec sufficiently satisfies both requirements for most applications in a real-time environment.

A second approach to the counter skew is to add back in a value corresponding to the amount of skew. This add-in value can accumulate as each additional read of the counter is done. When the value is added back in, this is done by incrementing the clock to the new value estimated to cover the time for reading and adding back in the value before restarting the counter. This way, the need to keep track of cumulative skew is eliminated, requiring only that it be determined each time and added back into the hardware counter itself. One difficulty with this approach is that the time for adding back in the value must also be taken into account in the skew, if this is done while the counter is stopped.

Another approach is a combination of the two methods above, using both the reset with a separate counter, and an add-in of the skew value for the count during a system clock period. If this combination technique is used, the second counter, which is read, is not pre-loaded to roll over at a value of the first counter. This is to avoid the possibility of an overcorrection by adding back in values, which might cause the second counter to reach 100 prior to its being reset, thus causing a very short period during which it rolls over and then is reset shortly thereafter.

7. Kernel Time Stamps

When software execution passes into the operating system kernel in the target computer, none of the tasks runs while the kernel itself is executing. The events of interest to the user for monitoring the tasks are relevant in relation to the particular times the tasks are running. Since no task is running while execution is in the kernel and even though events in the kernel may occur at different times in real time, time is essentially stopped for the tasks while execution is in the kernel. Accordingly, a single time stamp will indicate the same position in the task for display purposes.

Thus, the present invention only records a single time stamp for events which occur in a single invocation of an operating system kernel function. The host recognizes these events as a group and appends the same time stamp to all of them. This minimizes the need to generate full time stamps, with the attendant intrusion time for calculating them, storage space for storing them in the event logs, and upload bandwidth for transmitting them to the host.

8. Object Instrumentation

The invention uses an object-oriented paradigm to operate on system entities (objects) with virtual functions. Task contexts, semaphores and message queues are all classes of objects. Each class of objects has a set of functions that operate on the class objects, such as an initialization routine, a destroy routine, and "show" routines. When an object is instantiated, the object contains in its core a pointer to a class data structure that contains pointers to all of these virtual functions. (There is a class data structure for each class of object.) Virtual functions are called by indirection through the class data structure. Included among the virtual functions in the class data structure is an "instrumentation routine" which logs information about the object when the routine is called. If the class is uninstrumented, the field denoting the instrumentation routine is set to null, and no instrumentation routine is called when an instrumentation point for that class of objects is passed in the kernel.

In the invention, there are two classes for each type of object—one instrumented, the other not. The difference between an instrumented object and an uninstrumented object is that the pointer in the core of each points to the appropriate instrumented or uninstrumented class. Thus, the user can instantiate both instrumented and uninstrumented objects of a given class. The option is useful to control the amount of event logging. The user has the option to log only events about objects that are of interest. By default, all objects are created as instrumented objects.

The preferred target operating system, VxWorks® from Wind River Systems, Inc., supports Unix® BSD-style signals along with POSIX-compatible signals. ("BSD" is the Berkeley System Distribution version of Unix®; "POSIX" is the Portable Operating System Interface, Part 1, International Standard ISO/IEC 9945-1: 1990, IEEE Std 1003.1-1990.) Accordingly, the invention includes a signal instrumentation routine which instruments or uninstruments all signal activities. The signal activities include suspending a task until delivery of a signal, pausing until delivery of a signal, sending a signal to a task, specifying the signal handler for a signal and entering the signal handler.

The following example code shows the creation of a semaphore, semaphore 3, then the enabling of signal instrumentation. At a later point, event logging starts for the object status event logging mode, instrumentation for all tasks created before this point in the application program is enabled, and instrumentation for semaphore 3 is enabled. Later still is the disabling of instrumentation and the end of event logging:

```
...
sem3Id = semMCreate (SEM_Q_FIFO);
...
/* enable signal instrumentation */
status = wvSigInst(INSTRUMENTATION_ON);
...
/* start event logging */
status = wvEvtLogEnable(OBJECT_STATUS);
...
/* enable object event instrumentation for all tasks
created prior to this point */
status = wvObjInst(OBJ_TASK, NULL, INSTRUMENTATION_ON);
/* enable object event instrumentation for semaphore 3 */
status = wvObjInst(OBJ_SEM, sem3Id, INSTRUMENTATION_ON);
...
/* disable signal instrumentation */
status = wvSigInst(INSTRUMENTATION_OFF);
...
/* stop event logging */
status = wvEvtLogDisable();
```

9. Dynamic Instrumentation

The user may also dynamically switch on or off instrumentation of an object. The user can accordingly optimize the amount of event logging.

The instrumented and uninstrumented class data structures contain pointers to each other. To change an instrumented object to an uninstrumented object, the invention obtains the pointer to the object's class via the pointer in the object's core, extracts the pointer to the uninstrumented class from the instrumented class's data structure, and installs this pointer in the object's core. A parallel procedure is applied to change an uninstrumented object to an instrumented object.

For the convenience of the user, the invention includes a routine which permits the user to instrument or uninstrument individual objects and to instrument or uninstrument groups of objects which exist at the time the instrumentation routine is called. Instrumentable objects include the system entities mentioned above, tasks contexts, semaphores and message queues.

The invention also includes a routine which allows the user to instrument or uninstrument a group of objects at their time of creation.

10. Kernel Hooks

Of course, the user will not always want to log any events. One of the goals of the invention is to allow the user to produce a bug-free target environment which, being bug-free, need not be instrumented. Accordingly, the instrumentation placed into the operating system of the target is conditional. If instrumentation is turned on, the events are logged. If instrumentation is turned off, the events are not logged. Also, it is important that the effects on the target environment of the uninstrumented operating system be as minimal as possible. The invention, therefore, maintains a dedicated variable which contains a pointer to an event logging function, or a null pointer if event logging is turned off. When any event needs to be logged, that dedicated variable is first tested to determine if event logging is turned on, as indicated by its value being non-null. In that case the invention calls the function at the address pointed to by that dedicated variable.

Thus, in the worst case, where instrumentation is not desired, only a load, compare and jump at each instrumentation point are added over a non-instrumented operating system. The difference between the uninstrumented and instrumented operating system, however, is only the call to the event logging routine itself. Both the uninstrumented and instrumented kernel execute the preceding load and test. This minimizes the differences between the debugging and non-debugging environment. (Of course, with knowledge of the code generator used or by coding at a low level, even the jump can be removed from the uninstrumented case.) Thus, the invention achieves conditional instrumentation with minimal uninstrumented overhead.

A template for a kernel hook is as follows:

```
/* If event logging is turned on . . . */
if (function_pointer)
{
    /* . . . then log the event . . . */
    (*function_pointer) ();
}
/* in any event, continue as though non-instrumented.
*/
```

11. Capture Log for Postmortem

The present invention provides an event buffer which logs events and their times. The buffer is periodically uploaded to a host. This invention minimizes the amount of information logged and allows the buffer to be uploaded only periodically, thus limiting the bandwidth requirement for uploading. For certain types of analysis, it may be desirable to examine the event buffer only upon certain occurrences, and not to continuously upload it. One such example is to monitor operations but only examine them upon failure of the target software or upon a crash of a target system. In such an event, it would be desirable to do a postmortem analysis that includes more information than is typically available from systems which allow inspection of the state of the software in memories at the time of crashing.

Figure 7:
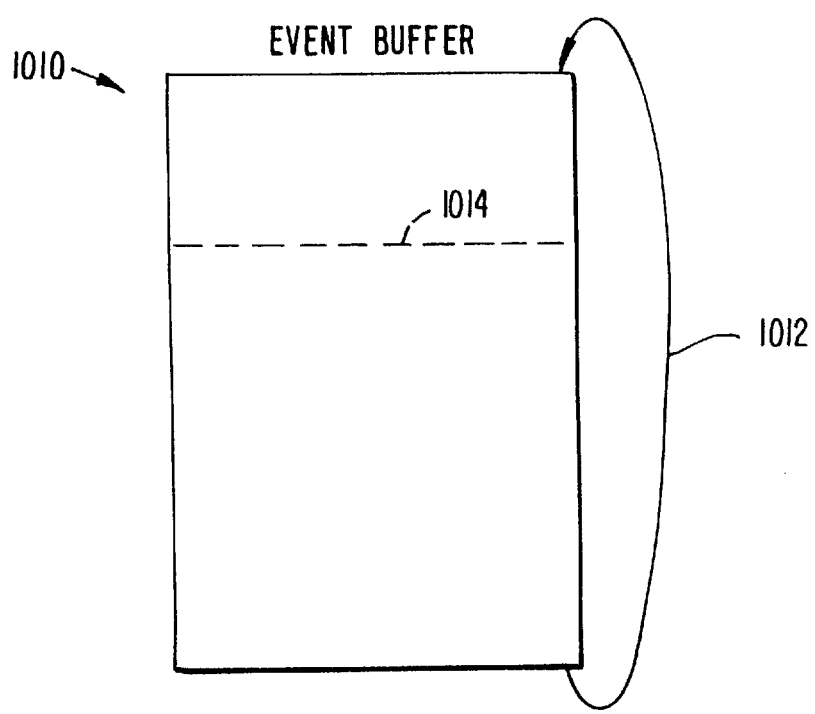
FIG. 7 is a diagram of the event buffer illustrating the post-mortem mode.

The present invention thus provides a postmortem mode. In this mode, instead of filling up the event buffer and then uploading it to the host when full, the invention continuously overwrites event buffer. Then, at the time of a crash, the event buffer will contain a full buffer's worth of information prior to that crash time. This is illustrated in FIG. 7, which shows event buffer 1010. As indicated by arrow 1012, when the buffer is full, writing starts again at the start of the buffer, overwriting the previous information. In the example shown, a crash may occur at time 1014. At this point, the data from the top of the buffer down to position 1014 has been overwritten, while the data from point 1014 to the bottom of the buffer has not been overwritten. Thus the time window leading up to the crash is established by the data from point 1014 to the end of the buffer, combined with the data from the top of the buffer down to point 1014.

Since the event buffer is not being periodically uploaded, it is desirable to define the event buffer to be as large as possible without interfering with the other memory requirements of the target system. Since this buffer is not being continuously uploaded, there is no bandwidth constraint on the size of the buffer used.

In order to implement such a postmortem analysis, a method is provided to prevent the memory of the target system from being cleared upon a reboot. Thus, when it is rebooted, the memory is maintained, and can be read to recover the event buffer information instead of clearing the memory to complete the reboot operation.

The postmortem feature is not only useful for debugging a target system but can also be used for debugging network operations. In a normal mode, since the event buffer is periodically uploaded, the uploading of the event buffer itself has an impact on the operation of the network, which can make the analysis of network problems more difficult. The postmortem mode allows the network operations to be monitored without any network connection being used by the instrumentation of the present invention until after a crash or other designated event.

In addition to software failure or a crash, the postmortem analysis can be programmed to be triggered by any event the user desires to use as a trigger.

12. User Defined Events

The invention allows the user to generate application-specific events, either from within the source code or at run-time. For example, the user may want to study the number of bytes allocated by every memory allocation call. As another form, the user may have an interest in when and for how long a particular function executes.

When the user has started event logging in any mode, the user can log application-specific events by inserting calls to an event-logging routine provided by the invention into the application source code or by setting eventpoints, described below.

In a preferred embodiment, the event-logging routine has three parameters: first, an event identifier specifying what event is being logged; second, a buffer pointer, pointing to the buffer holding the information to be logged; and third, a count, specifying the size of the buffer. Thus, a user routine can notice the occurrence of an event, unusual or otherwise, and can log that occurrence. The user will be aware at the time of programming what information will be necessary to accurately log the event and can thus allocate an appropriately sized buffer, collect into that buffer such information as is necessary to chronicle the event and provide the buffer and its size to the event-logging routine of the invention. The user will uniquely number each type of event thus logged. This unique number is the first parameter to the event-logging routine of the invention.

The invention includes the data gathered in the event-logging routine in its collective log of events communicated from the target to the host. The host will display user events with a user event icon, as described above. The unique number of a user-defined event, provided as the first parameter to the event-logging routine, will be displayed in proximity to the user event icon.

An example of application source code for error-checking purposes is as follows:

```
if (something) {
    /* run this code
}
else {
    /* should never get here, but if we do, display info
    */
    return = wvEvent(EVENT_1_ID, &event1Buff,
         EVENT_1_BUFSIZE);
}
```

An "eventpoint" is a modification to the application code resident in memory such that when the modified code is executed, an event is logged. Notably, because the memory-resident version of the application is modified, no provisions need have been made beforehand, particularly at programming time, in order to log the event. The user instructs the invention as to where (i.e., at what program address) an eventpoint should be placed and what the unique identifying number of the event is. In a preferred embodiment, the user specifies the task in which the event should be raised, what function should be called when the eventpoint is encountered and what the parameter is for the evtRtn function. If an invalid task is specified, then the event is to be raised in all tasks. If the function pointer is null, then a default function is called.

The invention maintains a list of eventpoints. Besides associating the program address, the task and the function with the eventpoint, the invention associates the original program code as well with the eventpoint. Thus, after the invention handles the eventpoint—either through a routine call or through a trap—the invention can still execute the code originally at the program address.

As before, the eventpoint information is logged and communicated to the host where a user event icon is displayed along with the event number.

13. Reconstruction of Target State on Host

An embodiment of the invention has the operating environment to be debugged and the analysis environment for debugging on separate processors, the target and the host, respectively. The processors communicate by any interprocessor communications means of sufficient bandwidth, preferably Ethernet using the TCP/IP protocol. Accordingly, the target generates events and communicates those events to the host over the Ethernet. (The target and host can be one machine, with communications via sockets, pipes, fifos, files or by other inter-task, uniprocessor communications means.)

The host reads raw event data from the socket or other communication means using a single, low-level routine which maintains its own buffering. This read routine is designed to perform blocking I/O to insure that the number of bytes requested are actually read. In critical sections, to insure that the call to the lower-level routine will not block, higher-level code checks data availability before proceeding in processing an event. The higher-level routine uses a second low-level routine which returns the number of bytes in the data stream of the communication means. All idle time is preferably spent in the rendering loop so that the graphical user interface will have sufficient cpu cycles to render the display in real time.

Figure 8:
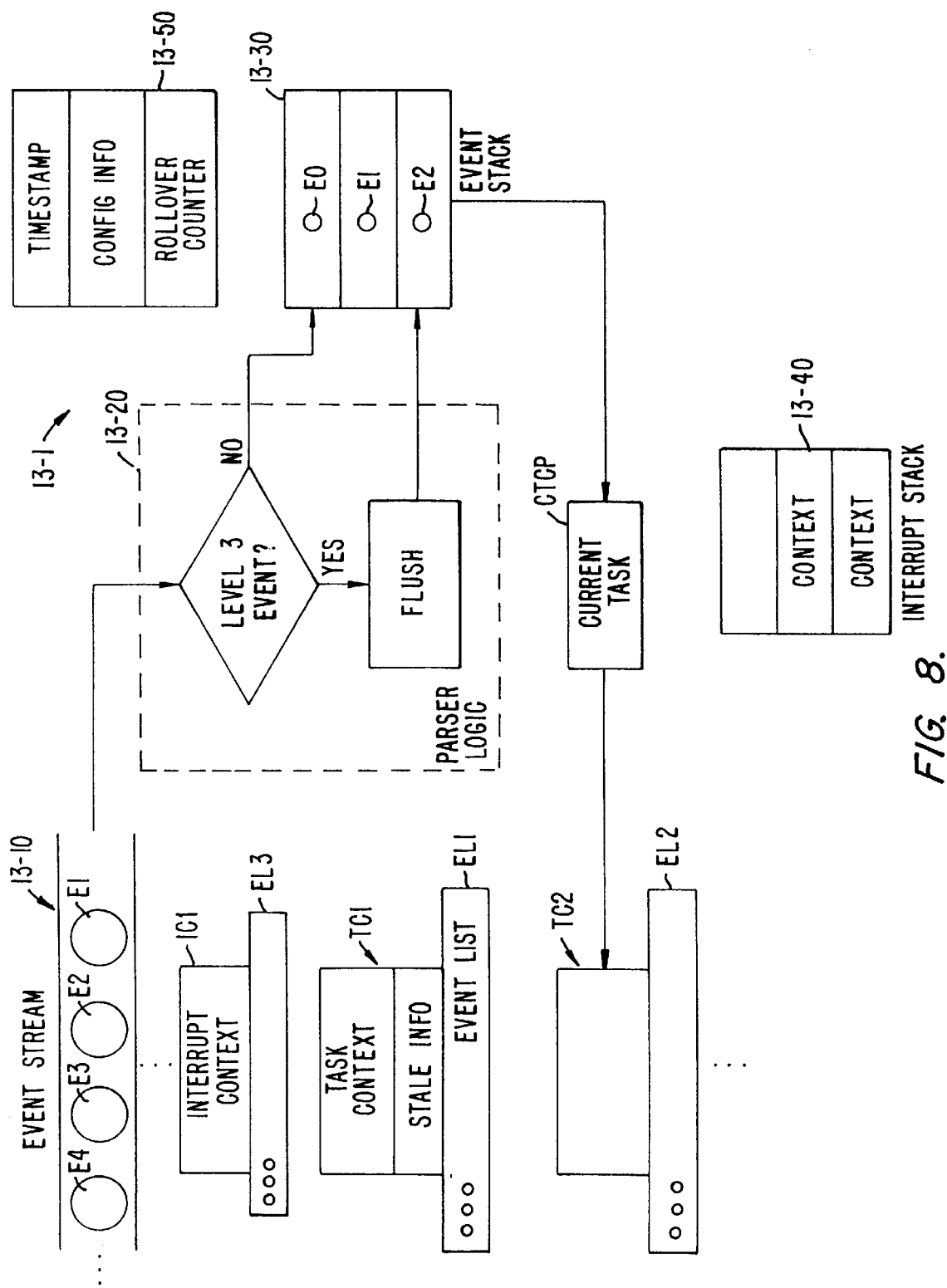
FIG. 8 is a schematic illustrating the reconstruction of the target state on the host.

FIG. 8 is a schematic illustrating the reconstruction of the state of the target (not shown) on the host 13-1. Event stream 13-10 symbolically represents the inter-task communications means, along which the target communicates events E (e.g., events E1, E2, E3 and E4) to host 13-1. In reading event E from event stream 13-10, host 13-1 allocates memory to temporarily hold that event E until event E can be stored in the disk page heap, described below. The host first reads the event ID of event E from event stream 13-10. Host 13-1 reads additional information such as time stamps and parameters, depending on the event ID.

Once host 13-1 has successfully read event E, host 13-1 processes the event according to its class. In a preferred embodiment, the event classes are three: level 1, 2 or 3. Level 1 events contain full documentation of an event, including time stamp. Corresponding level 2 events, however, contain only minimal information. Since level 2 events are not timestamped, host 13-1 must defer further processing of such events until the reading of the next level 3 event E: A level 3 event E is guaranteed to follow a level 2 event E. At that time, the level 2 event will receive the time stamp of the level 3 event. In order to accomplish this, host 13-1 maintains event stack 13-30. Event stack 13-30 is the temporary repository of all events E which are not required to have a time stamp (i.e., non-level 3 events). Level 1 events are immediately pushed onto the stack so that they can be paired with their subsequent level 2 event. When host 13-1 encounters a level 2 event, host 13-1 searches stack 13-30 for a corresponding level 1 event. If it finds one, host 13-1 discards the level 2 event in favor of the more detailed level 1 event. If the search fails, host 13-1 pushes the level 2 event onto the stack. Level 3 events cause the stack to be flushed. Each of the events E which has no time stamp receives the time stamp of that level 3 event, and all of the events E are placed onto the event list EL of the current task context TC. The current task context TC is indicated by the current task context pointer CTCP.

Figure 14:
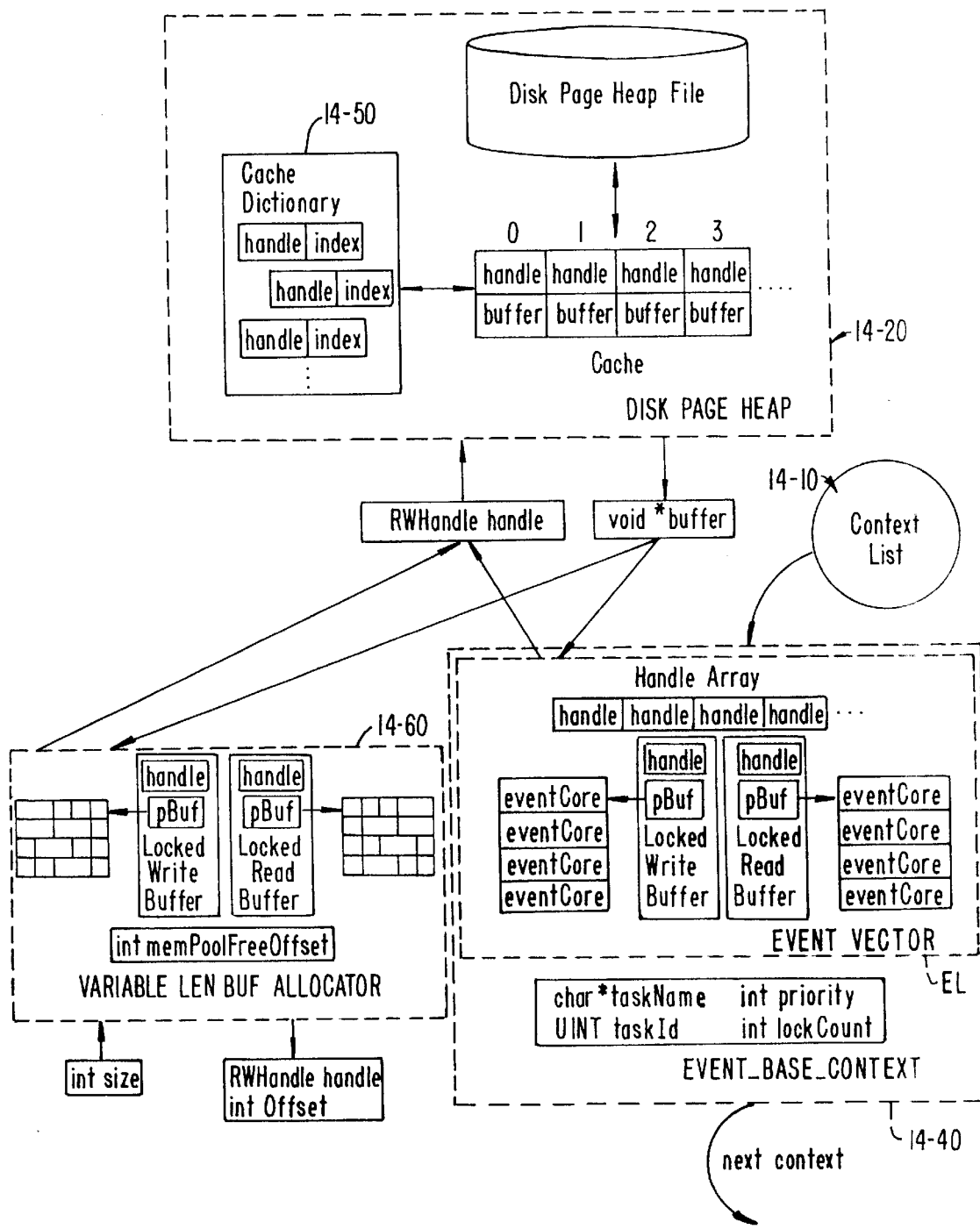
FIG. 14 sketches the structure of task or interrupt contexts in a preferred embodiment.

FIG. 14 shows the structure of a task context TC or interrupt context IC in a preferred embodiment. Each task context and each interrupt context is represented by a data structure 14-40 which stores all the events E generated in the given context, as well as static and dynamic data. Static data includes the task name, the task ID, task priority, etc., and dynamic data includes task state. These context data structures are strung together as a linked list, context list 14-10. As related above, events E of a context are stored sequentially in an event list EL. Memory to hold the events is obtained from the disk page heap, described below. Events are stored contiguously in each page obtained from the disk page heap. Host 13-1 stores disk page heap page handle identifiers returned by the disk page heap allocator in an array which allocator 14-20 reallocates with a larger size when full.

Disk page heap 14-20 implements a fixed buffer size memory allocator. The buffers (i.e., pages) are allocated from a disk file and cached in memory. Four primitive operations provide the core functionality of the disk page heap: allocate, allocate a page and return a handle; lock, read the page associated with a given handle into memory and return a pointer to that memory; unlock, release the memory obtained from a previous lock; and dirty, mark a handle as dirty, so when it is unlocked, the memory buffer will be flushed to the appropriate page on disk.

Hash table-based dictionary 14-50 keeps track of which pages are memory resident in the page cache. Disk page heap 14-20 uses a pseudo-random cache replacement algorithm to obtain memory for newly locked pages. The cache size is tunable by the user to achieve adequate performance in machines with smaller memory configurations. In a preferred embodiment, the default cache size is 1024 pages. The expectation is that most data will in fact be cache resident for average-sized event logs. The disk becomes involved only in the analysis of fairly long lengths of time with high event density.

Hash table dictionary 14-50 dramatically improves the performance of the disk page heap over the linear search of an array of handles. Also, the state of disk page heap 14-20 can be saved to and restored from disk. When doing a "save" from the graphical user interface, host 13-1 flushes the disk page heap cache to disk and saves some internal state information. Correspondingly, a "restore" from the graphical user interface creates a new disk page heap object. Host 13-1 sets the state of that new object to the state from the previous save operation.

To retrieve an event, the page containing the event must be "locked" into memory by calling the disk page heap's lock routine with the handle associated with the page containing the event. The handle for the page containing a specific event is defined by:

handle=handleArray[eventIndex/numEventsPerPage]

The event offset into the page is:

offset=eventindex % numEventsPerPage where numEventsPerPage is the disk page heap page size divided by the size of an event core.

The event so retrieved is actually an event core. Since events are variable size, the event core contains the minimal amount of information required by the majority of event types. If the actual event contains more information than is storable in an event core, the event core contains a handle and offset pointing to the additional information. This extra space is managed by the variable length buffer allocator, which allocates space from the disk page heap.

Some level 2 and level 3 events indicate the state transition of a task. Each task context TC has a status word which duplicates the status word of the task on the target. When events occur which cause task state transition, host 13-1 modifies the bits in the corresponding task context TC. Host 13-1 also generates a "pseudo-event" which stores the new status word in event list EL. Although host 13-1 could reconstruct the status word at any given time by modifying the current status word according to status-affecting events as encountered in walking event list EL, there is a significant improvement in speed in calculating and storing the status word in event list EL as the status word is modified.

Context switches can occur on exits from the kernel and interrupts. When an exit from the kernel occurs, host 13-1 searches context list 14-10 for the context whose ID matches that of the task whose execution is begun or resumed. Host 13-1 installs this found context as the current task via the current task context pointer CTCP. In the case of entry into an ISR, host 13-1 installs the interrupt context IC for the given interrupt as the current text. Host 13-1 also maintains an interrupt context stack 13-40 for tracking context switches in interrupt processing. Host 13-1 uses stack 13-40 to record the context which was interrupted so that that context can be restored on the next event indicating exit from an ISR. After a new context is installed, whether by kernel exit, ISR entry or ISR exit, all subsequent events are recorded in the new context until the next context switch occurs. Accordingly, interrupt contexts IC1, IC2 (not shown), . . . , each have an event list EL tracking events which occur at that interrupt level.

In a preferred embodiment, the user is allowed to scroll the time line of FIG. 9 to display different times slices. Therefore, host 13-1 must be capable of efficiently determining the state of all task and interrupt contexts at any particular point in time. For a given time duration, host 13-1 creates a linked list of state structures which represent the states that a context went through for the time duration. Host 13-1 performs a binary search on the event list EL of a task TC or interrupt context IC to find the event closest to the end of the time duration of interest. Host 13-1 then traverses event list EL, examining events sequentially, searching for the state transition pseudo-events described above. Because the parameter to this type of event is a duplicate of the status word of a task, host 13-1 can readily determine the state of the task of interest.

Each time host 13-1 finds a new pseudo-event, it creates a new state structure, fills in that structure with the duration and state derived from the pseudo-event parameter, and string that structure onto the context's state transition list. This process continues until host 13-1 arrives at the end of event list EL or the events founds are outside the time duration of interest. (As events are examined in event list EL, host 13-1 makes copies and strings them onto a linked list. This allows host 13-1 to examine the events directly.)

A user may desire to search for a specific event in the numerous events tracked by the target and host. By specifying the event ID of the event of interest, the context in which to search, a starting time and a time line direction, the user can cause host 13-1 to perform a binary search on the specified context's event list to find the closest event to the given time. Host 13-1 then traverses the event list in the specified direction until an event with the specified event ID is found. In a preferred embodiment, the user may specify either the event ID or the context as "DON'T CARE" values. If the event ID is specified as DON'T CARE, then host 13-1 will find the closest event to the given time in the given direction in the given context. If the context is specified as DON'T CARE, then all contexts are searched as described above, and the event ID-type event closest to the given time is found.

The processing time involved to read large raw eventlogs can be prohibitive. Therefore, in a preferred embodiment, there is a capability to save a processed eventlog. Since the event data is already stored on disk in the disk page heap, saving is accomplished by storing the state of all other objects and data structures in a disk file. One way to achieve this is to traverse the task context list and the interrupt contexts, saving data along the way to a file. The disk page heap cache should be flushed to insure that all event data has been written to disk.

Restoring is accomplished by reading in context state information that had been previously saved to disk.

In a preferred embodiment, a minimal shell surrounds the apparatus for reconstructing the state of the target. This shell can read raw event logs and print their contents. This is a useful feature, particularly when attempting to diagnose problems on the target which corrupt the event stream.

Host 13-1 also maintains a counter 13-50 tracking the time on the target. Time stamps in events E inform host 13-1 of the progression of time on the target. By storing the latest time stamp, host 3-1 can maintain an accurate copy of the clock on the target. Alternatively, host 13-1 can maintain configuration information about the target timer and instrumentation mode. The timer information can include the clock frequency, the clock period, whether rollover is enabled and the clock rate. When an event indicating a timer tick interrupt occurs, host 13-1 can use the configuration information to compute the time on the target. This is useful for example, sequential event numbers are used for time stamps instead of timer-based time stamps.

Even though a preferred environment of the invention is real-time, the invention is not limited to real-time environments. Rather, the invention is useful wherever an analysis of a dynamic or multi-threaded software system and/or its applications is desirable.

While the terminology used herein is tied to a preferred embodiment of the Wind River Systems, Inc. VxWorks® operating system, the invention is not limited to VxWorks®. Indeed, VxWorks® is only a specific example of corresponding general operating system concepts.

What is claimed is:

1. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of displaying comprises displaying a list of identifiers of said plurality of contexts along a first axis of said display, displaying an indication of time progression along a second axis of said display; and for a plurality of said identifiers, for a time period along said time progression, displaying a graphical pattern corresponding to execution in one of said plurality of contexts.

2. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of displaying comprises displaying a list of identifiers of said plurality of contexts along a first axis of said display, displaying an indication of time progression along a second axis of said display; and for a plurality of said identifiers, for a time period along said time progression, displaying one of a plurality of graphical patterns, each of said plurality of graphical patterns corresponding to a different task state of a task.

3. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of displaying comprises displaying a list of identifiers of said plurality of contexts along a first axis of said display, displaying an indication of time progression along a second axis of said display; and for a plurality of said identifiers, for a time period along said time progression, displaying an icon representing an action undertaken among said plurality of contexts.

4. The method of claim 3 wherein said step of displaying an icon comprises displaying a first graphic representing the category of the action and displaying a second graphic representing the event action.

5. The method of claim 4 wherein said action is creation of a semaphore and said step of displaying an icon further comprises displaying a third graphic representing the type of said semaphore.

6. The method of claim 4 wherein said action is announcement of expiration of a time period and said step of displaying an icon further comprises displaying a third graphic representing the type of time period which has expired.

7. The method of 3 wherein said method further comprises highlighting an event icon; and displaying information associated with the highlighted event icon in a textual format.

8. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of logging comprises storing an event identifier, a time stamp and an array of parameters in a predetermined order in a buffer, and wherein said step of logging further comprises storing event data related to the rollover of a hardware timer counter in said buffer and said step of storing a time stamp comprises storing the data count of said hardware timer counter at the time of one of said plurality of events.

9. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said steps of logging and uploading overlap, and said uploading is performed periodically.

10. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of logging comprises repeatedly overwriting a buffer of data and afterwards terminating said logging and said step of uploading comprises uploading the data in said buffer only after said logging is terminated.

11. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein before said step of running is performed, the following steps are performed by the user:

modifying the source code of one of said plurality of tasks to log event data; and compiling said modified source code to produce one of said plurality of tasks.

12. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein before said step of logging is performed, the following step is performed:

modifying the memory-resident image of one of said plurality of tasks to log event data.

13. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said event data comprises multi-level representations of multi-level events; and wherein said step of reconstructing and storing comprises generating single-level representations of said events from said multi-level representations, and associating each of said single-level representations with a context, said context being the context in which occurred the event represented by said each single-level representation.

14. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said event data is a time-ordered stream of representations of said events; and wherein the information necessary to reconstruct one of said events is contained in at least two representations.

15. A method for monitoring the execution of a plurality of tasks in the memory of a target computer, said method comprising the steps of:

coupling said target computer to a host program with a communications link;

running a plurality of tasks on said target computer, producing a plurality of contexts;

logging event data representing a plurality of events in said plurality of contexts;

uploading said event data from said target computer memory to said host program;

reconstructing a status of said tasks from said event data, and storing reconstructed data in said host program; and displaying said status from said reconstructed data for a period of time for a plurality of said tasks on a single display, wherein said step of logging comprises logging event data related to state transitions among said plurality of contexts for a time period, wherein said event data is a time-ordered stream of representations of said events;

wherein each of said plurality of contexts has a status word;

wherein said host program maintains a corresponding status word for the status word of said each context; and wherein said step of reconstructing and storing comprises modifying said corresponding status word for each event which causes a task state transition in a context, and inserting a representation of said modified corresponding status word into said stream.

16. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said step of displaying comprises displaying a list of identifiers of said plurality of contexts along a first axis of said display, displaying an indication of time progression along a second axis of said display; and for a plurality of said identifiers, for a time period along said time progression, displaying a graphical pattern corresponding to execution in one of said plurality of contexts.

17. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said step of displaying comprises displaying a list of identifiers of said plurality of contexts along a first axis of said display, displaying an indication of time progression along a second axis of said display; and for a plurality of said identifiers, for a time period along said time progression, displaying one of a plurality of graphical patterns, each of said plurality of graphical patterns corresponding to a different task state of a task.

18. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said step of displaying comprises displaying a list of identifiers of said plurality of contexts along a first axis of said display, displaying an indication of time progression along a second axis of said display; and for a plurality of said identifiers, for a time period along said time progression, displaying an icon representing an action undertaken among said plurality of contexts.

19. The apparatus of claim 18 wherein said step of displaying an icon comprises displaying a first graphic representing the category of the action and displaying a second graphic representing the event action.

20. The apparatus of claim 19 wherein said action is creation of a semaphore and said step of displaying an icon further comprises displaying a third graphic representing the type of said semaphore.

21. The apparatus of claim 19 wherein said action is announcement of expiration of a time period and said step of displaying an icon further comprises displaying a third graphic representing the type of time period which has expired.

22. The apparatus of 18 wherein said host computer memory program further comprises highlighting an event icon; and displaying information associated with the highlighted event icon in a textual format.

23. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said step of logging comprises storing an event identifier, a time stamp and an array of parameters in a predetermined order in a buffer, and wherein said step of logging further comprises storing event data related to the rollover of a hardware timer counter in said buffer and said step of storing a time stamp comprises storing the data count of said hardware timer counter at the time of one of said plurality of events.

24. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said steps of logging and uploading overlap, and said uploading is performed periodically.

25. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said step of logging comprises repeatedly overwriting a buffer of data and afterwards terminating said logging and said step of uploading comprises loading the data in said buffer only after said logging is terminated.

26. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein before said step of running is performed, the following steps are performed by the user:

modifying the source code of one of said plurality of tasks to log event data; and compiling said modified source code to produce one of said plurality of tasks.

27. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein before said step of logging is performed, the following step is performed:

modifying the memory-resident image of one of said plurality of tasks to log event data.

28. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said event data comprises multi-level representations of multi-level events; and wherein said step of reconstructing and storing comprises generating single-level representations of said events from said multi-level representations, and associating each of said single-level representations with a context, said context being the context in which occurred the event represented by said each single-level representation.

29. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said event data is a time-ordered stream of representations of said events; and wherein the information necessary to reconstruct one of said events is contained in at least two representations.

30. An apparatus for monitoring the execution of a plurality of tasks in the memory of a target computer, said apparatus comprising:

a target computer having memory, in which is located a computer program to cause said target computer to run a plurality of tasks, producing a plurality of contexts, and log event data representing a plurality of events in said plurality of contexts;

a communications link;

a display; and a host computer, coupled to said target computer by means of said communications link, coupled to said display and having a memory, in which is located a computer program to cause said host computer to upload said event data from said target computer memory, reconstruct a status of said plurality of tasks from said event data, and storing reconstructed data in said host computer, and display said status from said reconstructed data for a period of time for a plurality of tasks by means of graphics on said display, wherein said event data is a time-ordered stream of representations of said events;

wherein each of said plurality of contexts has a status word;

wherein said host program maintains a corresponding status word for the status word of said each context; and wherein said step of reconstructing and storing comprises modifying said corresponding status word for each event which causes a task state transition in a context, and inserting a representation of said modified corresponding status word into said stream.

* * * * *